(12) United States Patent
Shrestha et al.

(10) Patent No.: US 11,736,972 B2
(45) Date of Patent: Aug. 22, 2023

(54) PROTOCOL OVERHEAD REDUCTION

(71) Applicant: QUALCOMM Incorporated, San Diego, CA (US)

(72) Inventors: Bharat Shrestha, San Diego, CA (US); Alberto Rico Alvarino, San Diego, CA (US); Umesh Phuyal, San Diego, CA (US); Mungal Singh Dhanda, Slough (GB); Ayan Sengupta, San Diego, CA (US); Xiao Feng Wang, San Diego, CA (US); Liangping Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 76 days.

(21) Appl. No.: 17/219,678

(22) Filed: Mar. 31, 2021

(65) Prior Publication Data

US 2022/0322131 A1 Oct. 6, 2022

(51) Int. Cl.
*H04W 28/02* (2009.01)
*H04W 28/06* (2009.01)
(Continued)

(52) U.S. Cl.
CPC ....... *H04W 28/0263* (2013.01); *H04W 28/06* (2013.01); *H04W 72/1263* (2013.01); *H04W 72/23* (2023.01); *H04W 84/06* (2013.01)

(58) Field of Classification Search
CPC ............ H04W 28/0263; H04W 28/06; H04W 28/065; H04W 72/1263; H04W 72/14;
(Continued)

(56) References Cited

U.S. PATENT DOCUMENTS

| 2008/0025312 A1* | 1/2008 | Kuppuswamy | ....... H04W 28/06 370/392 |
| 2009/0034476 A1* | 2/2009 | Wang | ..... H04W 28/06 370/310 |

(Continued)

FOREIGN PATENT DOCUMENTS

WO WO-2017035697 A1 3/2017

OTHER PUBLICATIONS

International Search Report and Written Opinion—PCT/US2022/018993—ISA/EPO—dated Jun. 14, 2022.

*Primary Examiner* — Robert C Scheibel
(74) *Attorney, Agent, or Firm* — Holland & Hart

(57) ABSTRACT

Methods, systems, and devices for wireless device are described. A wireless device may receive a configuration for a data radio bearer associated with voice traffic in a wireless communications network. In some examples, the configuration may indicate one or more parameters associated with the voice traffic. Additionally, or alternatively, the wireless device may receive a configuration for a data radio bearer and a configured grant associated with voice traffic. The wireless device may identify a mapping between a configured grant identifier and the data radio bearer based on the configuration In some examples, the wireless device may generate a transport block including the voice traffic based on the one or more parameters associated with the voice traffic or the mapping between the configured grant identifier and the data radio bearer. The wireless device may then transmit the generated transport block including the voice traffic.

58 Claims, 15 Drawing Sheets

(51) Int. Cl.
  *H04W 72/1263* (2023.01)
  *H04W 72/23* (2023.01)
  *H04W 84/06* (2009.01)

(58) Field of Classification Search
  CPC ....... H04W 72/08; H04W 84/06; H04W 4/70;
              H04L 69/10; H04L 41/0803
  See application file for complete search history.

(56) References Cited

U.S. PATENT DOCUMENTS

| | | | |
|---|---|---|---|
| 2013/0039278 A1* | 2/2013 | Bouazizi | H04L 69/22 |
| | | | 370/328 |
| 2016/0234800 A1* | 8/2016 | Jung | H04L 1/1864 |
| 2017/0135116 A1* | 5/2017 | Kuchibhotla | H04L 43/087 |
| 2019/0141773 A1* | 5/2019 | Kim | H04W 74/0833 |
| 2019/0199427 A1* | 6/2019 | Zakaria | H04B 7/18513 |
| 2019/0335508 A1* | 10/2019 | Agiwal | H04W 48/14 |
| 2020/0137820 A1* | 4/2020 | Kim | H04W 76/19 |
| 2022/0104062 A1* | 3/2022 | Aijaz | H04W 72/1242 |
| 2022/0132557 A1* | 4/2022 | Kuo | H04W 72/1289 |
| 2022/0232635 A1* | 7/2022 | Lee | H04W 74/008 |
| 2022/0279594 A1* | 9/2022 | Chen | H04W 76/27 |

* cited by examiner

PROTOCOL OVERHEAD REDUCTION

FIELD OF TECHNOLOGY

The following relates to wireless communication at a wireless device, including protocol overhead reduction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support communications with non-terrestrial devices. Communications in wireless communications systems supporting non-terrestrial devices may be improved.

SUMMARY

The described techniques relate to improved methods, systems, devices, and apparatuses that support protocol overhead reduction. Generally, the described techniques provide for transport block generation with reduced header. In some wireless communications systems, a large header may add a large overhead, particularly for packets having a small payload (e.g., packets carrying voice traffic). To reduce overhead from headers, one or more aspects of the present disclosure provide for wireless communications systems to support a voice-based data radio bearer. In some aspects, a wireless device receives a configuration for a data radio bearer associated with voice traffic. The configuration indicates one or more parameters associated with the voice traffic communicated over a wireless communications network. For example, the configuration may indicate a data radio bearer identifier or one or more parameters (e.g., voice-specific parameters) associated with a data radio bearer. The wireless device generates a transport block including the voice traffic based on the one or more parameters associated with the voice traffic and transmits the generated transport block.

A method for wireless communication at a wireless device is described. The method may include receiving, from a wireless network node, a configuration for a data radio bearer associated with voice traffic in a wireless communications network, the configuration indicating one or more parameters associated with the voice traffic communicated over the wireless communications network, generating a transport block including the voice traffic based on the one or more parameters associated with the voice traffic, and transmitting, over the wireless communications network, the generated transport block including the voice traffic.

An apparatus for wireless communication at a wireless device is described. The apparatus may include a processor, memory coupled with the processor, and instructions stored in the memory. The instructions may be executable by the processor to cause the apparatus to receive, from a wireless network node, a configuration for a data radio bearer associated with voice traffic in a wireless communications network, the configuration indicating one or more parameters associated with the voice traffic communicated over the wireless communications network, generate a transport block including the voice traffic based on the one or more parameters associated with the voice traffic, and transmit, over the wireless communications network, the generated transport block including the voice traffic.

Another apparatus for wireless communication at a wireless device is described. The apparatus may include means for receiving, from a wireless network node, a configuration for a data radio bearer associated with voice traffic in a wireless communications network, the configuration indicating one or more parameters associated with the voice traffic communicated over the wireless communications network, means for generating a transport block including the voice traffic based on the one or more parameters associated with the voice traffic, and means for transmitting, over the wireless communications network, the generated transport block including the voice traffic.

A non-transitory computer-readable medium storing code for wireless communication at a wireless device is described. The code may include instructions executable by a processor to receive, from a wireless network node, a configuration for a data radio bearer associated with voice traffic in a wireless communications network, the configuration indicating one or more parameters associated with the voice traffic communicated over the wireless communications network, generate a transport block including the voice traffic based on the one or more parameters associated with the voice traffic, and transmit, over the wireless communications network, the generated transport block including the voice traffic.

Some examples of the method, apparatuses, and non-transitory computer-readable medium described herein may further include operations, features, means, or instructions for receiving an identifier associated with the data radio bearer and determining that the data radio bearer may be associated with the voice traffic based on the identifier associated with the data radio bearer, where the generation of the transport block may be based on determining that the data radio bearer may be associated with the voice traffic.

Some examples of the method, apparatuses, and non-transitory computer-readable medium described herein may further include operations, features, means, or instructions for identifying the one or more parameters associated with the voice traffic based on receiving the configuration and determining that the data radio bearer may be associated with the voice traffic based on the one or more parameters, where the generation of the transport block may be based on determining that the data radio bearer may be associated with the voice traffic.

In some examples of the method, apparatuses, and non-transitory computer-readable medium described herein, generating the transport block may include operations, features, means, or instructions for identifying a quality of service flow identifier without including a service data adaptation protocol header in the transport block based on the data radio bearer being associated with the voice traffic in the wireless communications network, where the generation of the transport block may be based on a quality of service profile that may be associated with the data radio bearer.

In some examples of the method, apparatuses, and non-transitory computer-readable medium described herein, generating the transport block may include operations, features, means, or instructions for generating the transport block including a packet data convergence protocol sequence number of a first length that may be less than a second length of the packet data convergence protocol sequence number associated with other data radio bearers associated with other types of traffic.

In some examples of the method, apparatuses, and non-transitory computer-readable medium described herein, generating the transport block may include operations, features, means, or instructions for generating the transport block without including a message authentication code for integrity. In some examples of the method, apparatuses, and non-transitory computer-readable medium described herein, generating the transport block may include operations, features, means, or instructions for generating the transport block including a voice packet without segmentation, the transport block including a radio link control layer protocol data unit.

In some examples of the method, apparatuses, and non-transitory computer-readable medium described herein, generating the transport block may include operations, features, means, or instructions for generating the transport block including two or fewer radio link control segmentations. In some examples of the method, apparatuses, and non-transitory computer-readable medium described herein, generating the transport block may include operations, features, means, or instructions for generating the transport block including a radio link control layer protocol data unit without including a radio link control header in the transport block.

In some examples of the method, apparatuses, and non-transitory computer-readable medium described herein, generating the transport block may include operations, features, means, or instructions for generating the transport block using a transparent mode at a radio link control layer. In some examples of the method, apparatuses, and non-transitory computer-readable medium described herein, generating the transport block may include operations, features, means, or instructions for generating the transport block including a medium access control header in the transport block.

In some examples of the method, apparatuses, and non-transitory computer-readable medium described herein, generating the transport block may include operations, features, means, or instructions for generating the transport block including a medium access control protocol data unit including a logical channel identifier associated with bearer for the voice traffic, the logical channel identifier including a reserved codepoint or a re-purposed codepoint.

Some examples of the method, apparatuses, and non-transitory computer-readable medium described herein may further include operations, features, means, or instructions for identifying a codepoint reserved for a voice data radio bearer from a mapping between a set of multiple codepoints and a set of multiple logical channel identifiers, where the generating of the transport block includes generating the transport block including a logical channel identifier corresponding to the identified codepoint.

Some examples of the method, apparatuses, and non-transitory computer-readable medium described herein may further include operations, features, means, or instructions for identifying a mapping between a set of multiple codepoints and a set of multiple logical channel identifiers, the mapping being associated with a non-terrestrial network, where the generating of the transport block includes generating the transport block including a logical channel identifier corresponding to at least one codepoint of the set of multiple codepoints.

In some examples of the method, apparatuses, and non-transitory computer-readable medium described herein, generating the transport block may include operations, features, means, or instructions for generating the transport block including a medium access control protocol data unit with a logical channel identifier indicating a length of a medium access control service data unit.

In some examples of the method, apparatuses, and non-transitory computer-readable medium described herein, the length of the medium access control service data unit may be configured via a radio resource control signal or a broadcast signal. In some examples of the method, apparatuses, and non-transitory computer-readable medium described herein, generating the transport block may include operations, features, means, or instructions for generating the transport block including a medium access control protocol data unit with a field in a header, the field including a bit, where a value of the bit indicates a number of medium access control service data units concatenated in the transport block.

In some examples of the method, apparatuses, and non-transitory computer-readable medium described herein, generating the transport block may include operations, features, means, or instructions for generating the transport block including a first field including a first bit and a second field including a second bit, where a combination of the first bit and the second bit indicates a quantity of radio link control service data units concatenated in the transport block.

In some examples of the method, apparatuses, and non-transitory computer-readable medium described herein, generating the transport block may include operations, features, means, or instructions for generating the transport block including a logical channel identifier indicating a length of a medium access control protocol data unit including one or more medium access control service data units, or one or more medium access control layer control elements, or a combination thereof.

In some examples of the method, apparatuses, and non-transitory computer-readable medium described herein, a first configured grant for the data radio bearer associated with the voice traffic may be configured with a first periodicity for a transport block size. In some examples of the method, apparatuses, and non-transitory computer-readable medium described herein, a second configured grant may be configured with a second periodicity with a start offset and the second configured grant may be used to transmit a buffer status report medium access control layer control element, a power headroom report medium access control layer control element, or an interspersed robust header compression feedback, or a combination thereof.

Some examples of the method, apparatuses, and non-transitory computer-readable medium described herein may further include operations, features, means, or instructions for communicating a scheduling request indicating a set of time and frequency resources for the data radio bearer associated with the voice traffic, where communication the scheduling request includes transmitting the scheduling request or receiving the scheduling request.

In some examples of the method, apparatuses, and non-transitory computer-readable medium described herein, generating the transport block may include operations, features, means, or instructions for generating the transport block including a first field, a second field and a third field in a packet data convergence protocol header of a protocol data unit, where the first field indicates whether the protocol data unit includes data or control information, the second field indicates whether a robust header compression header may be included in a packet data convergence protocol control packet, and the third field includes a packet data convergence protocol sequence number.

In some examples of the method, apparatuses, and non-transitory computer-readable medium described herein, generating the transport block may include operations, features, means, or instructions for generating the transport block including a packet data convergence protocol control protocol data unit including the robust header compression header and the packet data convergence protocol sequence number.

Some examples of the method, apparatuses, and non-transitory computer-readable medium described herein may further include operations, features, means, or instructions for generating a concatenated packet including a first packet of voice data and a second packet of voice data concatenated in a protocol data unit, the first packet of voice data including a retransmitting of a prior packet of voice data and the second packet of voice data including an original transmission of a current packet of voice data.

Some examples of the method, apparatuses, and non-transitory computer-readable medium described herein may further include operations, features, means, or instructions for retransmitting the concatenated packet including the first packet of voice data and the second packet of voice data for a threshold quantity of transmissions. In some examples of the method, apparatuses, and non-transitory computer-readable medium described herein, a first configured grant for the data radio bearer associated with the voice traffic may be associated with an information packet and a second configured grant for the data radio bearer associated with the voice traffic may be associated with a duplicate of the information packet.

In some examples of the method, apparatuses, and non-transitory computer-readable medium described herein, the second configured grant for the data radio bearer associated with the voice traffic includes a robust header compression feedback packet, a robust header compression header, or the duplicate of the information packet dropped by a medium access control layer control element, or a combination thereof. In some examples of the method, apparatuses, and non-transitory computer-readable medium described herein, the wireless communications network includes a non-terrestrial network.

A method for wireless communication at a wireless device is described. The method may include receiving a configuration for a data radio bearer and a configured grant associated with voice traffic, identifying a mapping between a configured grant identifier and the data radio bearer based on the configuration, generating a transport block including the voice traffic based on the mapping between the configured grant identifier and the data radio bearer, and transmitting the generated transport block including the voice traffic.

An apparatus for wireless communication at a wireless device is described. The apparatus may include a processor, memory coupled with the processor, and instructions stored in the memory. The instructions may be executable by the processor to cause the apparatus to receive a configuration for a data radio bearer and a configured grant associated with voice traffic, identify a mapping between a configured grant identifier and the data radio bearer based on the configuration, generate a transport block including the voice traffic based on the mapping between the configured grant identifier and the data radio bearer, and transmit the generated transport block including the voice traffic.

Another apparatus for wireless communication at a wireless device is described. The apparatus may include means for receiving a configuration for a data radio bearer and a configured grant associated with voice traffic, means for identifying a mapping between a configured grant identifier and the data radio bearer based on the configuration, means for generating a transport block including the voice traffic based on the mapping between the configured grant identifier and the data radio bearer, and means for transmitting the generated transport block including the voice traffic.

A non-transitory computer-readable medium storing code for wireless communication at a wireless device is described. The code may include instructions executable by a processor to receive a configuration for a data radio bearer and a configured grant associated with voice traffic, identify a mapping between a configured grant identifier and the data radio bearer based on the configuration, generate a transport block including the voice traffic based on the mapping between the configured grant identifier and the data radio bearer, and transmit the generated transport block including the voice traffic.

In some examples of the method, apparatuses, and non-transitory computer-readable medium described herein, generating the transport block may include operations, features, means, or instructions for generating the transport block without including a service data adaptation protocol header, a radio link control header and a medium access control header in the transport block and generating a packet data convergence protocol header in the transport block.

In some examples of the method, apparatuses, and non-transitory computer-readable medium described herein, the packet data convergence protocol header includes a byte indicating a packet data convergence protocol sequence number length or a sequence number shared by a packet data convergence protocol layer associated with the wireless device and an application layer associated with the wireless device. In some examples of the method, apparatuses, and non-transitory computer-readable medium described herein, identifying the mapping may include operations, features, means, or instructions for identifying the mapping between a set of multiple configured grant identifiers and the data radio bearer.

In some examples of the method, apparatuses, and non-transitory computer-readable medium described herein, identifying the mapping may include operations, features, means, or instructions for identifying the mapping between the configured grant identifier and an identifier associated with the data radio bearer. In some examples of the method, apparatuses, and non-transitory computer-readable medium described herein, the configuration may be associated with a codec rate, a control frame associated with the voice traffic, or a combination thereof.

DETAILED DESCRIPTION

Figure 1:
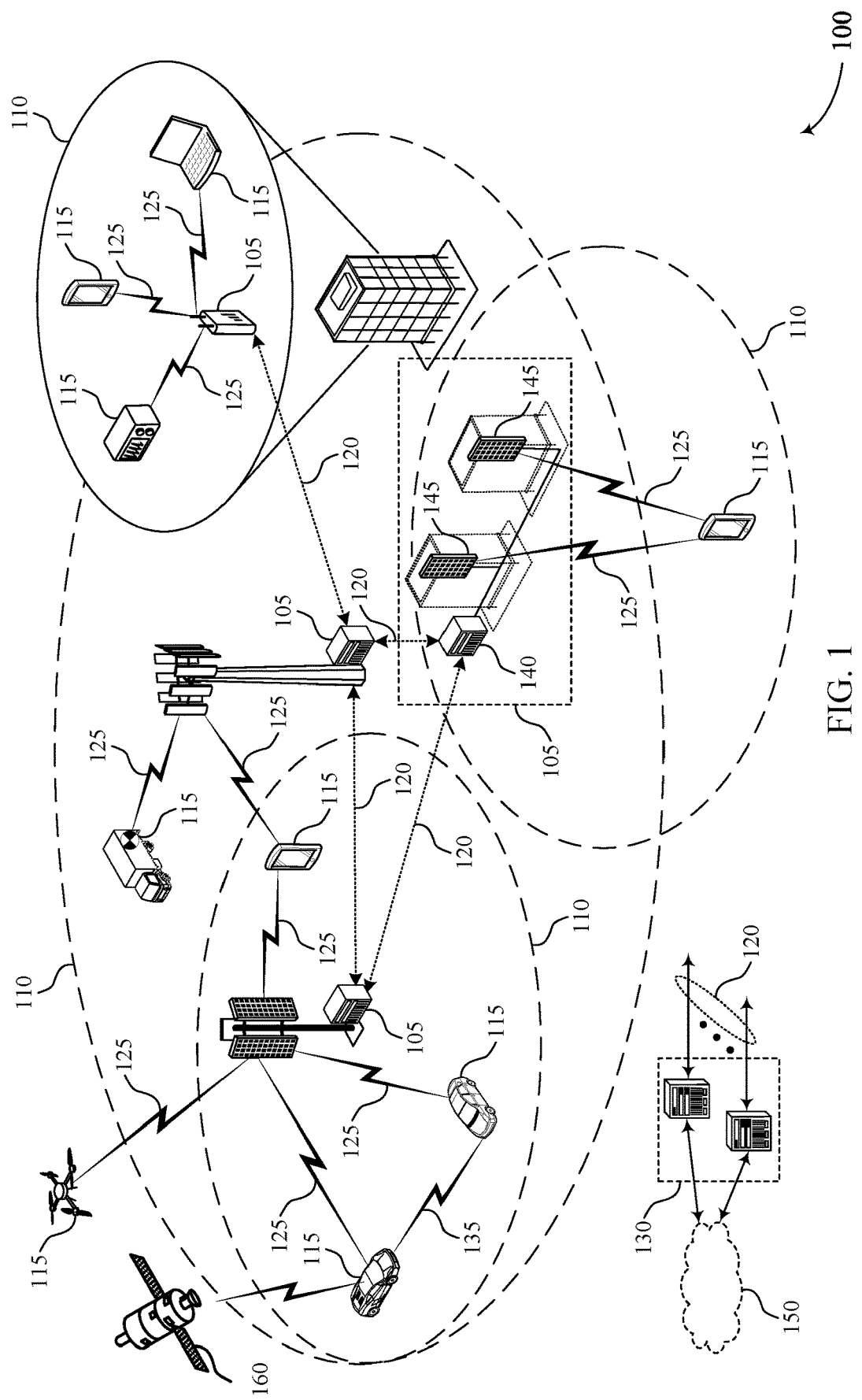
FIG. 1 illustrates an example of a wireless communications system that supports protocol overhead reduction in accordance with aspects of the present disclosure.

A wireless communications system may support communication between one or more communication devices. In particular, a wireless communications system may support voice and data communications between a transmitter and a receiver. According to some examples, a transmitter (e.g., a base station, non-terrestrial devices, etc.) may be configured with multiple antennas, which may be used for transmission and reception of voice packets. Similarly, a receiver (e.g., a user equipment (UE)) may be configured with multiple antennas, which may be used for transmission and reception of voice packets. Non-terrestrial networks (e.g., wireless communications systems supporting non-terrestrial communication devices) may support voice service between UEs and wireless network nodes. An example of a wireless network node in a non-terrestrial network may include a satellite. In non-terrestrial networks, because of large propagation delay and reduced link budget between a UE and a wireless network node, it may be useful to reduce a size of a packet (e.g., reduce a payload size of the packet). For voice packets there are several information elements in a packet that are not the actual payload but are related to other information such as header or feedback information. In some wireless communications systems, when a wireless device prepares a packet for transmission, each protocol layer may add one or more headers. As such, headers may occupy a large proportion of the transport block compared to the user data payload (e.g., voice packets).

One or more aspects of the present disclosure provide for wireless communications systems to support a voice-based data radio bearer that may reduce overhead in a packet due to some headers. In particular, one or more aspects of the present disclosure provides for a wireless device to receive a configuration for a data radio bearer associated with voice traffic in a wireless communications network. In some examples, the wireless device may receive the configuration from a wireless network node. In some examples, the configuration may indicate one or more parameters associated with the voice traffic communicated over the wireless communications network. The wireless device may generate a transport block including the voice traffic based on the one or more parameters associated with the voice traffic. In some examples, aspects of the present disclosure provides for a voice-specific data radio bearer, where the wireless device receives a data radio bearer identifier and identifies voice-specific parameters or identifies specific configuration for the data radio bearer. Additionally, or alternatively, aspects depicted herein provide for change in one or more headers or subheaders associated with medium access control. In some examples, the wireless device may generate a transport block using a new or enhanced logical channel identifier. In some examples, the wireless device may identify a configured grant configured with a fixed periodicity for a fixed transport block size. According to one or more aspects, the wireless device may be configured to split a robust header compression header and a payload. In such examples, the wireless device may transmit the robust header compression header and the payload as separate packets in additional shared channel resource. Additionally, or alternatively, aspects of the present disclosure provide for concatenation of prior and current voice frames in the same protocol data unit. Additionally, or alternatively, one or more configured grant identifiers may be mapped to a single voice data radio bearer or mapped one-to-one with multiple voice data radio bearers. The wireless device may thus generate the transport block according to one or more aspects depicted herein. The wireless device may then transmit the transport block.

Communication devices having the capability to use protocol overhead reduction for wireless communications may utilize the techniques described herein to reduce resource usage while ensuring reliable and efficient communications between UEs and base stations. Particular aspects of the subject matter described in this disclosure may be implemented to realize one or more enhancements. The techniques employed by the described UEs may provide benefits and enhancements to the operation of the UEs. For example, operations performed by the UEs may provide improvements to wireless operations. For example, these techniques may improve a link budget for voice data communicated over some wireless communication systems (e.g., non-terrestrial networks). Additionally, or alternatively, the techniques employed by the described UEs may provide time and power savings. In some examples, the UEs may support high reliability and low latency communications, among other examples, in accordance with one or more aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are further illustrated by and described with reference to protocol data units and transport block generation process. Aspects of the disclosure are further illustrated by and described with reference to apparatus diagrams, system diagrams, and flowcharts that relate to protocol overhead reduction.

FIG. 1 illustrates an example of a wireless communications system 100 that supports protocol overhead reduction in accordance with aspects of the present disclosure. The wireless communications system 100 includes one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 provides a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or packet data convergence protocol layer may be IP-based. A radio link control layer may perform packet segmentation and reassembly to communicate over logical channels. A medium access control layer may perform priority handling and multiplexing of logical channels into transport channels. The medium access control layer may also use error detection techniques, error correction techniques, or both to support retransmissions at the medium access control layer to improve link efficiency. In the control plane, the radio resource control protocol layer may provide establishment, configuration, and maintenance of a radio resource control connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A wireless multiple-access communications system may include a number of base stations or network access nodes, each simultaneously supporting communication for multiple communication devices, which may be otherwise known as UE. In some wireless communications system, a base station and a UE may implement beamforming to initiate and continue communication.

Wireless communications system 100 may also include one or more satellites 160. Satellite 160 may communicate with base stations 105 (also referred to as gateways in non-terrestrial networks) and UEs 115 (or other high altitude or terrestrial communication devices). Satellite 160 may be any suitable type of communication satellite configured to relay communications between different end nodes in a wireless communication system. Satellite 160 may be an example of a space satellite, a balloon, a dirigible, an airplane, a drone, an unmanned aerial vehicle, and/or the like. In some examples, the satellite 160 may be in a geosynchronous or geostationary earth orbit, a low earth orbit (LEO) or a medium earth orbit. A satellite 160 may be a multi-beam satellite configured to provide service for multiple service beam coverage areas in a predefined geographical service area. The satellite 160 may be any distance away from the surface of the earth.

In some cases, a cell may be provided or established by a satellite 160 as part of a non-terrestrial network. A satellite 160 may, in some cases, perform the functions of a base station 105, act as a bent-pipe satellite, or may act as a regenerative satellite, or a combination thereof. In other cases, satellite 160 may be an example of a smart satellite, or a satellite with intelligence. For example, a smart satellite may be configured to perform more functions than a regenerative satellite (e.g., may be configured to perform particular algorithms beyond those used in regenerative satellites, to be reprogrammed, etc.). A bent-pipe transponder or satellite may be configured to receive signals from ground stations and transmit those signals to different ground stations. In some cases, a bent-pipe transponder or satellite may amplify signals or shift from uplink frequencies to downlink frequencies. A regenerative transponder or satellite may be configured to relay signals like the bent-pipe transponder or satellite, but may also use on-board processing to perform other functions. Examples of these other functions may include demodulating a received signal, decoding a received signal, re-encoding a signal to be transmitted, or modulating the signal to be transmitted, or a combination thereof. For example, a bent-pipe satellite (e.g., satellite 160) may receive a signal from a base station 105 and may relay the signal to a UE 115 or base station 105, or vice-versa.

UEs 115 may communicate with satellites 160 and/or base stations or gateways 105 using communications links 125. In some cases, timing adjustments to account for propagation delay of the communications links 125 via a satellite 160 may include a propagation delay between a UE 115 and a satellite 160, a propagation delay between a base station 105 and a satellite 160, as well as a variation in the propagation delays due to movement of the satellite. In accordance with various techniques discussed herein, the UE 115 may perform cell selection based on the propagation delays between satellite 160 and UE 115. Thus, one or more aspects described herein may provide for efficient communications in non-terrestrial networks.

A UE 115 and/or a base station 105 receives a configuration for a data radio bearer associated with voice traffic in a wireless communications network. In some examples, the UE 115 and/or the base station 105 receives the configuration from a wireless network node. In some examples, the wireless network node includes a base station 105 or a satellite or a node of a core network. The configuration indicates one or more parameters associated with the voice traffic communicated over the wireless communications network. The UE 115 and/or the base station 105 generates a transport block including the voice traffic based on the one or more parameters associated with the voice traffic. The UE 115 and/or the base station 105 transmits, over the wireless communications network, the generated transport block including the voice traffic.

In some examples, the UE 115 and/or the base station 105 receives a configuration for a data radio bearer and a configured grant associated with voice traffic. The UE 115 and/or the base station 105 identifies a mapping between a configured grant identifier and the data radio bearer based on the configuration. The UE 115 and/or the base station 105 generates a transport block including the voice traffic based on the mapping between the configured grant identifier and the data radio bearer. The UE 115 and/or the base station 105 then transmits the generated transport block including the voice traffic.

Figure 2:
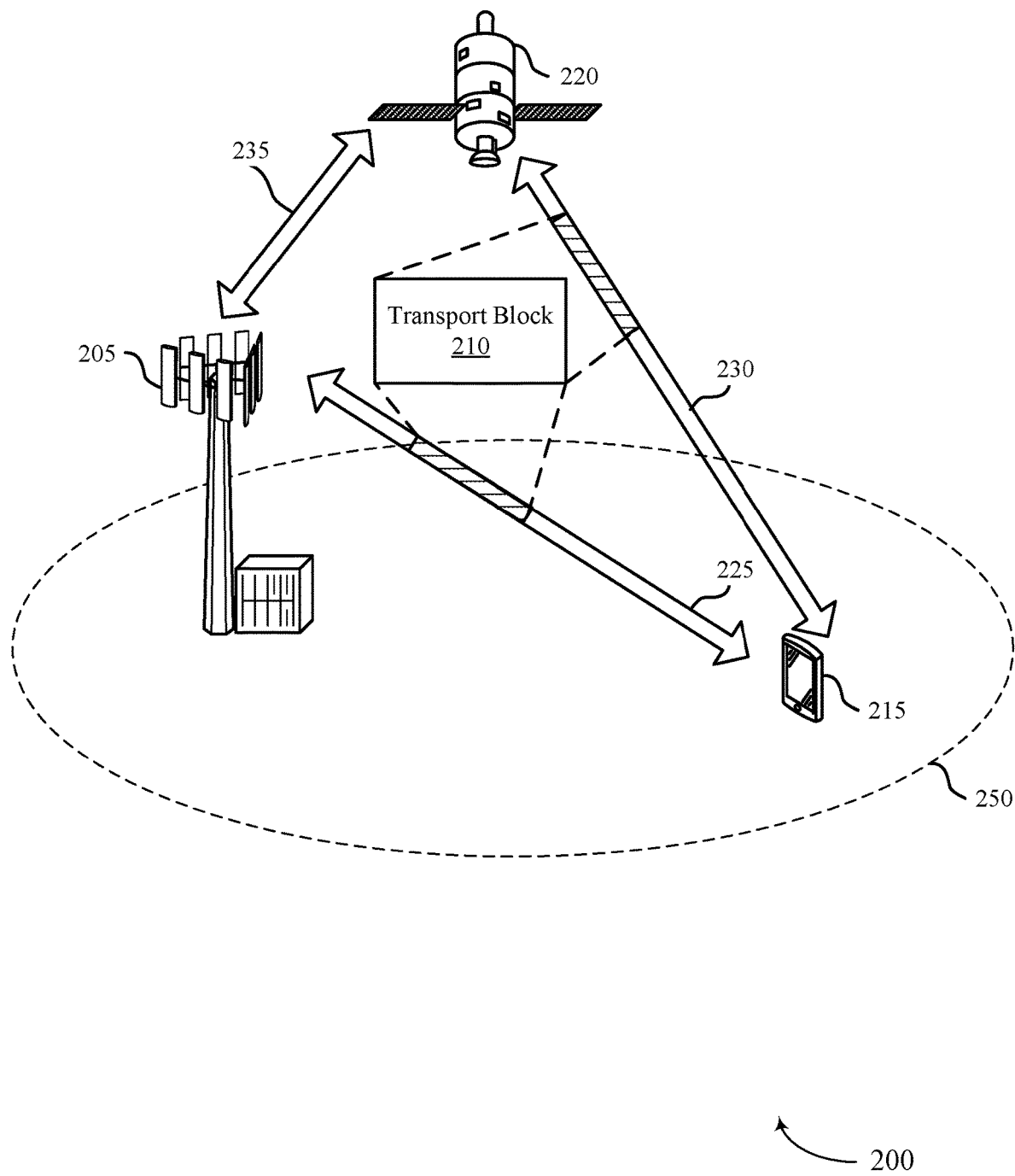
FIG. 2 illustrates an example of a wireless communications system that supports protocol overhead reduction in accordance with aspects of the present disclosure.

FIG. 2 illustrates an example of a wireless communications system 200 that supports protocol overhead reduction in accordance with aspects of the present disclosure. In some examples, the wireless communications system 200 may implement aspects of wireless communications system 100. The wireless communications system 200 includes one or more base stations 205, one or more UEs 215, and one or more communication devices 220. In some examples, the base station 205 and the communication device 220 described in FIG. 2 may be examples of the base stations 105 described with reference to FIG. 1. Additionally, or alternatively, the communication device 220 may be an example of a non-terrestrial device, such as a satellite. In some examples, base station 205 may be referred to as a network device and/or a next generation NodeB (gNB). UE 215 may be an example of a UE 115 described with reference to FIG. 1. Base station 205 may be an example of a serving base station 105 for UE 215. Although not depicted herein, other base stations may be examples of neighboring base stations 105 and may be present in the wireless communications system 200. In some examples, a satellite (e.g., communication device 220) may, in some cases, perform the functions of a base station 105, act as a bent-pipe satellite, or may act as a regenerative satellite, or a combination thereof. A bent-pipe satellite may be configured to receive signals from ground stations and transmit those signals to different ground base stations 205. A regenerative satellite may be configured to use on-board processing to perform other functions in addition to relaying signals.

The wireless communications system 200 may illustrate operations of and communications between the base station 205, the UEs 115 and one or more communication devices 220 that support protocol overhead reduction for communication networks to increase accuracy for timing measurements and decrease latency. For example, the wireless communications system 200 may provide for protocol overhead reduction in non-terrestrial networks. In some examples, each communication device 220 may provide a cell. Additionally, or alternatively, multiple cells may be associated with a communication device 220. In some examples, a base station 205 may be associated with a cell and can provide service for a UE 215 within the coverage area 250 of the cell. The UE 215 may move within the coverage area 250, and the cell may provide wireless communications to UE 215. Some examples of the wireless communications system 200 may support an improved accuracy for voice communication for non-terrestrial network. Additionally, or alternatively, the UE 215 may be connected to a base station 205 via communications link 225, the base station 205 may be connected to a communication device 220 via communications link 235, and the communication device 220 may be connected to the UE 215 via communications link 230. As shown herein, the UE 215 and the communication device 220 may communicate without communicating with the base station 205. Alternatively, the communications between the UE 215 and the communication device 220 may be relayed through a ground base station (e.g., base station 205).

In some examples, non-terrestrial networks (e.g., wireless communications system 200) may support voice service between UEs and wireless network nodes (e.g., base station 205 and communication device 220). For voice packets there are several information elements in a packet which are not the actual payload but are related to other information such as header or feedback information. The protocol overhead may reduce an achievable data rate in non-terrestrial networks. In some examples, when a wireless device (e.g., UE 215 or base station 205) prepares a packet for transmission, each protocol layer adds one or more headers or subheaders. In some examples, the length of packet used for headers or subheaders may increase by the time the packet is ready for transmission. The payload size is small for voice traffic and as a result, a large header may add overhead that may not be fully utilized for that particular payload. For each packet generated by codec (e.g., per 20 ms), protocol headers may incur an overhead. Such an overhead may reduce a data rate. In non-terrestrial networks and/or other types of wireless communications systems, because of large propagation delay and reduced link budget, communications efficiency may be improved with a reduced payload size, such as by reducing an amount of a packet that is used for headers or subheaders.

One or more aspects of the present disclosure provides for protocol overhead reduction in voice service in wireless communications systems (e.g., wireless communications system 200). In particular, aspects of the present disclosure provides for circuit switch-like voice service in non-terrestrial networks supporting NR. In some examples, the UE 215 may receive, from a wireless network node, a configuration for a data radio bearer associated with voice traffic in a wireless communications network (e.g., wireless communications system 200). In some examples, the configuration may indicate one or more parameters associated with the voice traffic communicated over the wireless communications network. In some examples, a base station 205 may receive configuration for the data radio bearer associated with voice traffic from a component of a core network (not shown). The UE 215 may be configured with a data radio bearer dedicated to the voice traffic. In some example, the UE 215 (and/or the base station 205) may generate a transport block 210 including the voice traffic based on the one or more parameters associated with the voice traffic. Upon generating the transport block 210, the UE 215 (and/or the base station 205) may transmit, over the wireless communications network, the generated transport block 210 including the voice traffic.

In some examples, the UE 215 may receive an identifier associated with the data radio bearer. The UE 215 may then determine that the data radio bearer is associated with the voice traffic based on the identifier associated with the data radio bearer. In some examples, the generation of the transport block 210 is based on determining that the data radio bearer is associated with the voice traffic. That is, the UE 215 may determine that the data radio bearer is associated with the voice traffic based on a configured explicit data radio bearer identifier (e.g., data radio bearer identifier=7). The UE 215 may then infer the one or more parameters (e.g., voice-specific parameters) based on determining that the data radio bearer is associated with the voice traffic. In one example, the UE 215 may determine that the one or more parameters indicate that the packet data convergence protocol sequence number length is of 6 bits.

In some examples, the data radio bearer identifier may not be configured to indicate that the data radio bearer is associated with the voice traffic. However, a base station 205 or other wireless node may add a configuration for a data radio bearer to configure it as a voice data radio bearer. For example, the UE 215 may identify the one or more parameters associated with the voice traffic based on receiving the configuration. The UE 215 may then determine that the data radio bearer is associated with the voice traffic based on the one or more parameters. In some examples, the generation of the transport block 210 is based on determining that the data radio bearer is associated with the voice traffic.

When generating a transport block 210 including voice traffic, the UE 215 may refrain from using a service data adaptation protocol header in the transport block 210. That is, the UE 215 may refrain from including a service data adaptation protocol header in the transport block 210 based on the data radio bearer being associated with the voice traffic in a wireless communications network (e.g., wireless communications system 200). In some examples, the UE 215 may use a predefined quality of service profile (e.g., a new set of quality of service identifiers). Thus, the UE 215 may generate a pre-defined quality of service flow identifier without including a service data adaptation protocol header in the transport block 210 based on the data radio bearer being associated with the voice traffic in the wireless communications network. In some examples, the generation of the transport block 210 is based on a quality of service profile that is associated with the data radio bearer.

According to one or more aspects, the UE 215 may generate the transport block 210 including a packet data convergence protocol sequence number of a first length that is less than a second length of the packet data convergence protocol sequence number associated with other data radio bearers associated with other types of traffic. For example, the UE 215 may be configured with a packet data convergence protocol sequence number length of 6 bits. In NR, 12 bits and 18 bits may be used as packet data convergence protocol sequence number lengths. Additionally, or alternatively, integrity protection may be disabled (i.e., not enabled by the base station 205). Disabling the integrity protection for the transport block 210 may save 4 bytes of overhead.

At the radio link control layer, the UE 215 may be configured to generate the transport block 210 including a voice packet without segmentation. In some examples, the transport block 210 may include a complete radio link control layer protocol data unit. That is, segmentation at the radio link control layer may not be supported for data radio bearers including voice traffic. In some examples, at most two radio link control layer segmentations may be supported. In some examples, the UE 215 may generate the transport block 210 including a radio link control layer protocol data unit (e.g., a complete radio link control layer protocol data unit) without including a radio link control header in the transport block 210. For instance, a wireless device (e.g., UE 215, base station 205 and/or communication device 220) may refrain from including a radio link control header in the transport block 210 if the wireless device determines that the transport block 210 has space to carry an entire voice packet, there is no re-transmission, and there is no multiplexing of voice and non-voice data into one radio link control layer protocol data unit. In some examples, the UE 215 and/or a wireless node may be configured to use a radio link control transparent mode. That is, the UE 215 may generate the transport block 210 using a transparent mode at a radio link control layer. According to one or more examples, the UE 215 and/or a wireless node may be configured to use a radio link control transparent mode and a medium access control layer transparent mode. That is, the UE 215 may generate the transport block 210 including a complete radio link control layer protocol data unit without including a radio link control header and/or a medium access control header in the transport block 210. In particular, the UE 215 may generate the transport block 210 using a transparent mode at a radio link control layer if one transport block 210 can carry exactly one medium access control layer protocol data unit and which in turn can carry one voice packet. In such a case, the UE 215 may refrain from using the one or more headers. Additionally, or alternatively, the medium access control layer header may include an identifier (e.g., logical channel identifier) indicating that the medium access control layer header carries a voice packet from a voice bearer associated with voice traffic (e.g., configured for voice traffic).

In some examples, a configured grant may be configured with a first periodicity (e.g., a periodicity of k ms) for a fixed transport block size taking into account a size (e.g., 3 bytes) of a robust header compression header. In some examples, a first configured grant for the data radio bearer associated with the voice traffic may be configured with a first periodicity for a transport block size. An additional configured grant or shared channel resource may be configured with a larger periodicity (e.g., multiple of k ms). The periodicity could be same or larger than that of the configured grant for voice data radio bearer but with a start offset. For example, a second configured grant may be configured with a second periodicity with a start offset. Alternatively, dynamic resources may be used for the additional configured grant. In some examples, the second configured grant may be used to transmit a buffer status report medium access control layer control element, a power headroom report medium access control layer control element, standalone packets not associated with a packet data convergence protocol service data unit, or an interspersed robust header compression feedback, or a combination thereof.

A specific scheduling request resource can be configured for this purpose such that scheduling request resource indicates the resources associated with data associated with the data radio bearer associated with voice traffic. In some examples, the base station 205 may transmit and the UE 215 may receive a scheduling request indicating a set of time and frequency resources for the data radio bearer associated with the voice traffic.

For a data radio bearer associated with voice traffic in wireless communications network (e.g., non-terrestrial network), a HARQ retransmission may be disabled. In particular, waiting for decoding results to decide an upcoming retransmission may increase latency. To improve the target block error ratio, the UE 215 and/or a wireless node may use a different set of physical parameters such as power control, modulation and coding scheme index, slot aggregation, or blind retransmission grant before decoding the packet, or a combination thereof. In addition, the UE 215 may be configured to perform aggregation of previous and current voice frames. The UE 215 may generate a concatenated packet including a first packet of voice data and a second packet of voice data concatenated in a protocol data unit. In some examples, the first packet of voice data may include a retransmitting of a prior packet of voice data and the second packet of voice data including an original transmission of a current packet of voice data. That is, previous and current voice frames may be concatenated in the same protocol data unit either by radio access network or an application. In some examples, the transmitted concatenated packet may include a mix of retransmission of previous packet and new transmission of current packet. The retransmission can be optional if there are other packets (e.g., if there are robust header compression feedback packet or a medium access control layer control element to transmit). In some examples, the concatenated packet may be retransmitted "x" (e.g., x=1) times. The retransmitted concatenated packet includes retransmission of both packets. For instance, the UE 215 may retransmit the concatenated packet including the first packet and the second packet for a threshold quantity of transmissions.

In some examples, wireless devices (e.g., UE 215, base station 205 and/or communication device 220) may be configured with primary and secondary configured grants (e.g., multiple configured grants) for original voice packet and duplicate voice packet. For instance, a first configured grant for the data radio bearer associated with the voice traffic may be associated with an information packet and a second configured grant for the data radio bearer associated with the voice traffic may be associated with a duplicate of the information packet. In some examples, the second configured grant for the data radio bearer associated with the voice traffic may include (or may be used to transmit) a robust header compression feedback packet, a robust header compression header (e.g., a robust header compression header greater than "y" bytes), or the duplicate of the information packet dropped by a medium access control layer control element, or a combination thereof.

Figure 3:
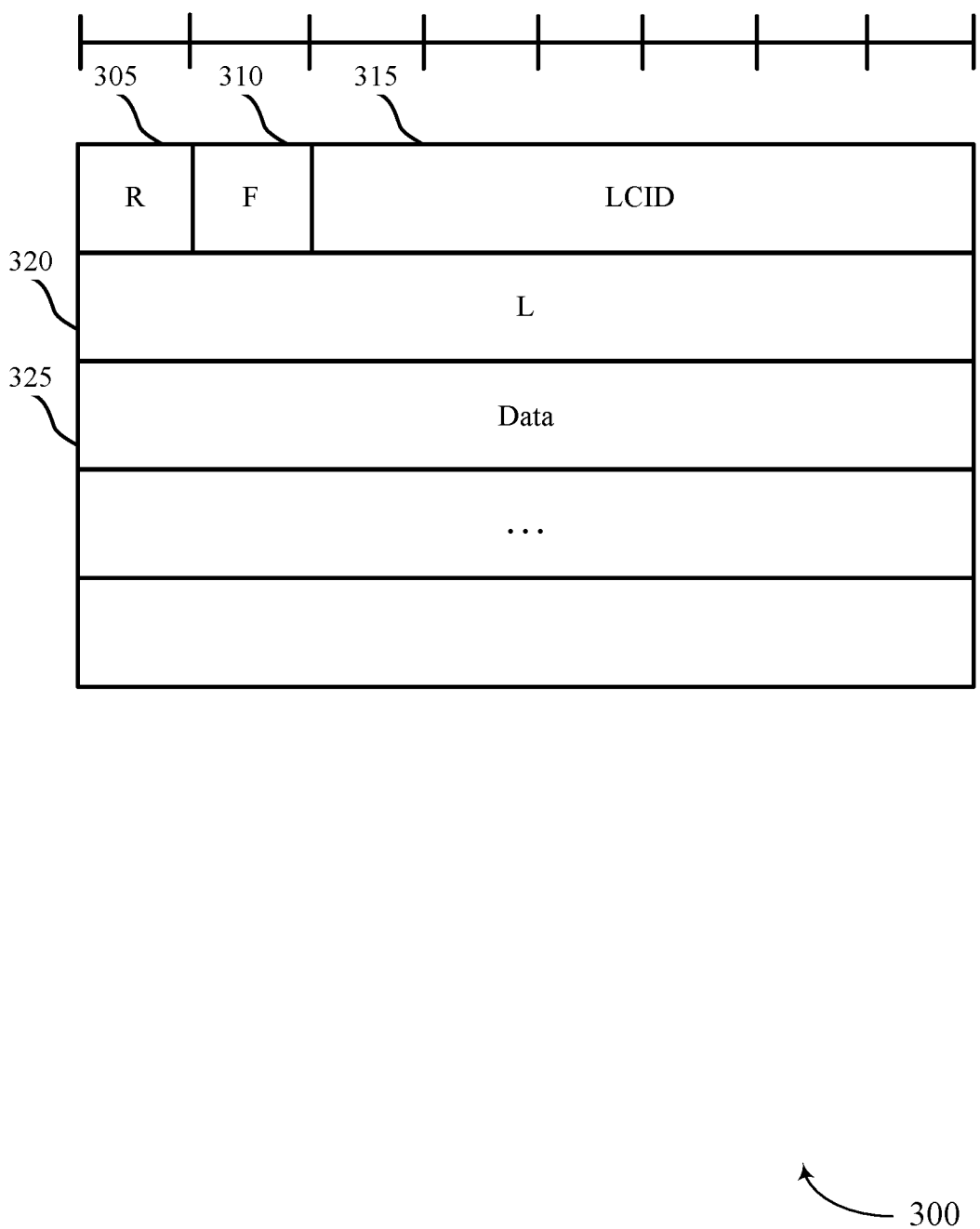
FIG. 3 illustrates an example of a protocol data unit that supports protocol overhead reduction in accordance with aspects of the present disclosure.

FIG. 3 illustrates an example of a protocol data unit 300 that supports protocol overhead reduction in accordance with aspects of the present disclosure. In some examples, the protocol data unit 300 may implement aspects of the wireless communications system 100 and the wireless communications system 200 as depicted with reference to FIG. 1 and FIG. 2. For example, UEs 115 and/or base stations 105, which may be examples of the corresponding devices as described with reference to FIGS. 1 and 2, may generate a transport block including the protocol data unit 300 according to techniques discussed herein.

The protocol data unit 300 may include a header including an "R" field 305, an "F" field 310, and an "LCID" field 315—e.g., a field for a logical channel identifier (LCID). The "R" field 305 may include a reserved bit and "F" field 310 may include a bit indicating a field. The "L" field 320, the data field 325 and the header including the "R" field 305, the "F" field 310, and the "LCID" field 315 may correspond to a medium access control subheader. As depicted herein, a wireless device (e.g., a communication device such as a UE or a base station) may support a data radio bearer associated with voice traffic. In particular, the wireless device may generate a transport block including the voice traffic based on one or more parameters associated with the voice traffic. The data radio bearer associated with voice traffic may be configured to use a transparent mode at a radio link control layer. In such cases, the radio link control layer may refrain from using the radio link control header or the radio link control header may be removed by the medium access control layer. In some examples, such a procedure may be identified by logical channel identifier (e.g., "LCID" field 315) used in a medium access control subheader. Alternatively, the wireless device may use an unacknowledged mode at the radio link control layer.

The wireless device may generate a transport block including a logical channel identifier associated with bearer for the voice traffic. As depicted in the example of FIG. 3, the protocol data unit 300 may include the logical channel identifier in the "LCID" field 315. The "LCID" field 315 includes a reserved codepoint or a re-purposed codepoint. For instance, reserved logical channel identifier bits may be included in the "LCID" field 315. Alternatively, the bits may be repurposed to indicate the logical channel identifier in the "LCID" field 315.

In some examples, the wireless device may receive a configuration including a table (Table 1) showing the mapping between indexes (or codepoints) and logical channel identifier values.

TABLE 1

| Codepoint/Index | LCID values |
| --- | --- |
| 0 | Common control channel (CCCH) of size 64 bits (sometimes referred to as "CCCH1") |
| 1-32 | Identity of the logical channel |
| 33 | Extended logical channel ID field (two-octet eLCID field) |
| 34 | Extended logical channel ID field (one-octet eLCID field) |
| 35-44 | Reserved |
| 45 | Truncated Sidelink Buffer Status Report (BSR) |
| 46 | Sidelink BSR |
| 47 | Reserved |

As shown in Table 1, one of codepoints (1-32) for logical channel identity may be reserved for data radio bearer associated with voice traffic. Additionally, or alternatively, the codepoint (45 or 46) for the sidelink buffer status report may be repurposed for data radio bearer associated with voice traffic (e.g., data radio bearer associated with voice traffic in non-terrestrial networks). In such an example, the wireless device may identify an index (e.g., codepoint) reserved for a voice data radio bearer from a mapping between a set of indexes (e.g., codepoints) and a set of logical channel identifiers. As depicted herein, the wireless device may identify the mapping between the set of indexes (e.g., codepoints) and the set of logical channel identifiers from Table 1. In some examples, the wireless device may generate a transport block including a logical channel identifier corresponding to the identified index.

In some examples, a new table (both for uplink and downlink) may be defined to be used for specific networks, such as non-terrestrial networks. In such an example, the wireless device may identify a mapping between a set of indexes (or codepoints) and a set of logical channel identifiers, where the mapping (e.g., a table) is associated with a non-terrestrial network. The wireless device may then generate a transport block including a logical channel identifier corresponding to at least one index of the set of indexes in the new table.

Figure 4A:
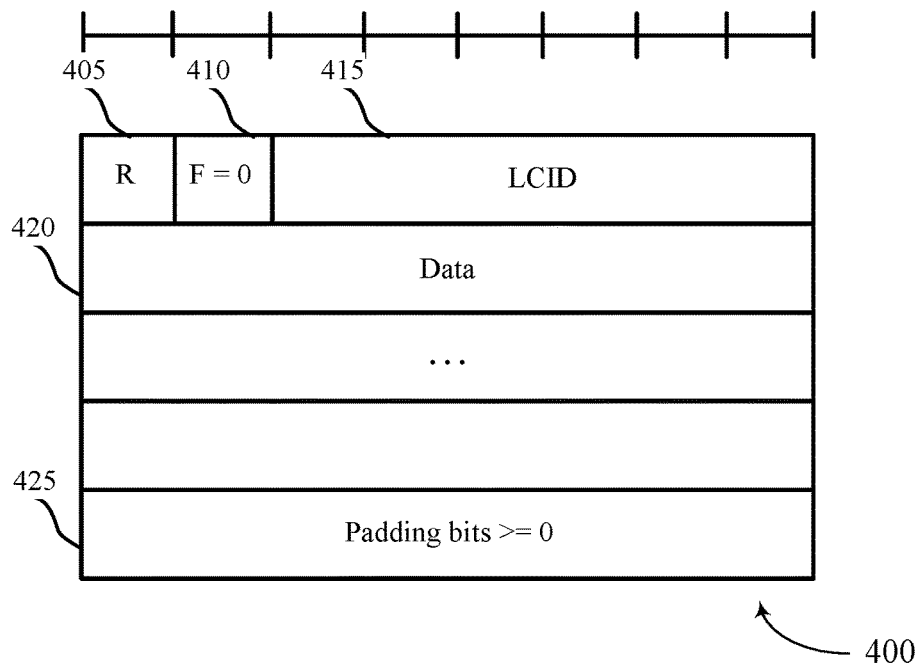
FIGS. 4A and 4B illustrate examples of protocol data units that support protocol overhead reduction in accordance with aspects of the present disclosure.
Figure 4B:
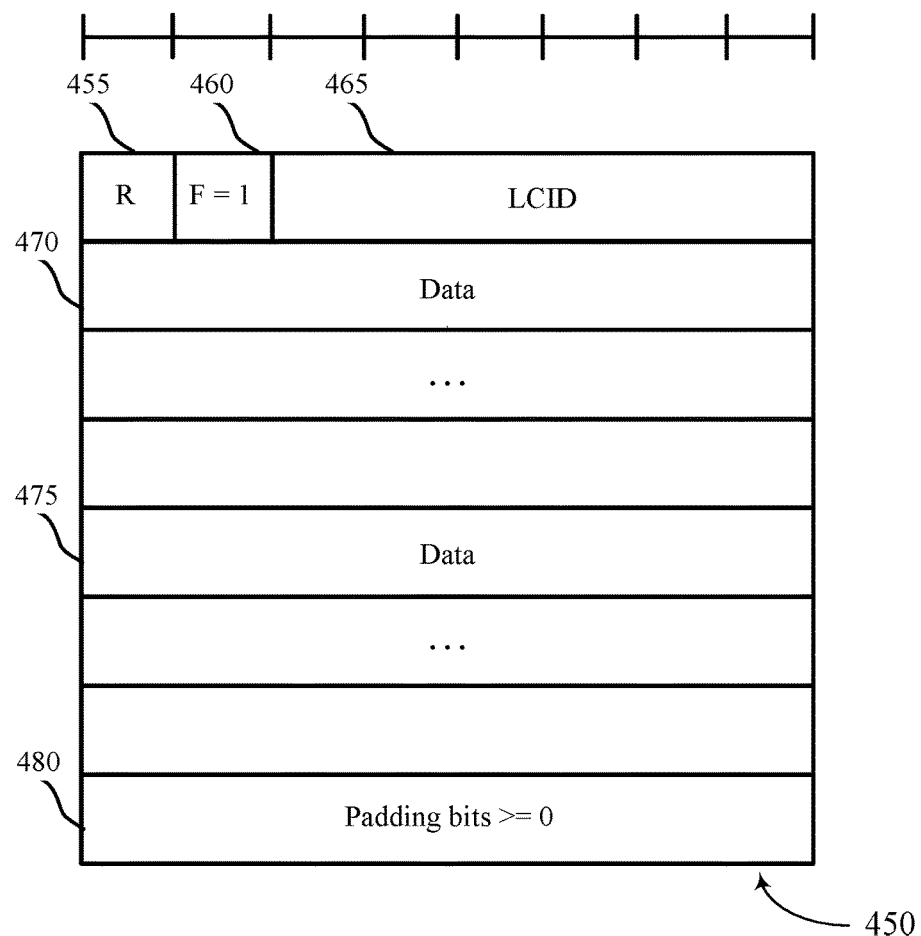

FIG. 4A illustrates an example of a protocol data unit 400 that supports protocol overhead reduction in accordance with aspects of the present disclosure. FIG. 4B illustrates an example of a protocol data unit 450 that supports protocol overhead reduction in accordance with aspects of the present disclosure. In some examples, the protocol data unit 400 and the protocol data unit 450 may implement aspects of the wireless communications system 100 and the wireless communications system 200 as depicted with reference to FIG. 1 and FIG. 2. For example, UEs 115 and/or base stations 105, which may be examples of the corresponding devices as described with reference to FIGS. 1 and 2, may generate a transport block including the protocol data unit 400 or the protocol data unit 450 or both according to techniques discussed herein.

The protocol data unit 400 includes a header including an "R" field 405, an "F" field 410, and an "LCID" field 415. The "R" field 405 includes a reserved bit and "F" field 410 includes a bit (F=0) indicating a field. The data field 420 with one or more additional fields (until padding bits in field 425) corresponds to a fixed size radio link control protocol data unit without radio link control header. As depicted herein, a wireless device (e.g., a communication device such as a UE or a base station) may support a data radio bearer associated with voice traffic. In particular, the wireless device may generate a transport block including the voice traffic based on one or more parameters associated with the voice traffic. The logical channel identifier used in the data radio bearer associated with voice traffic may be configured to indicate a fixed length of medium access layer service data unit. In some examples, a length of the of medium access layer service data unit (a total of "x+y+1" bytes) may be used for the logical channel identifier. As depicted herein, the wireless device may generate a transport block including a medium access control protocol data unit with a logical channel identifier indicating a length of a medium access control service data unit. The length of the medium access control service data unit may be configured via a radio resource control signal or a broadcast signal. The protocol data unit 400 may include "x" bytes of voice payload, "y" bytes of robust header compression header, 1 byte of packet data convergence protocol header, and 0 byte of radio link control header. The protocol data unit 400 does not include the length field ("L") in the medium access control subheader to save 1 byte overhead.

As the length field ("L") field is not used, the wireless device may repurpose the "F" field 410 (1 bit) to concatenate two medium access control service data units. The wireless device may generate the transport block including a field ("F" field 410) in a header, the field including a bit, where a value of the bit indicates a number of medium access control service data units concatenated in the transport block. In particular, a value 0 of the "F" field 410 may indicate there is one (x+y+1 byte) medium access control service data unit. A value 1 of the "F" field 410 may indicate there are two (x+y+1 byte) medium access control service data units (as shown in FIG. 4B). The bits in the field 425 may include padding bits. In addition, both the "R" field 405 and the "F" field 410 may be used to concatenate four radio link control layer service data units.

As depicted in the example of FIG. 4B, the protocol data unit 450 includes a header including an "R" field 455, an "F" field 460, and an "LCID" field 465. The "R" field 455 includes a reserved bit and "F" field 460 includes a bit (F=1) indicating a field. The data field 470 with one or more additional fields corresponds to a fixed size radio link control protocol data unit without radio link control header and the data field 475 and one or more additional fields (until padding bits in field 480) corresponds to a fixed size radio link control protocol data unit without radio link control header. As depicted herein, the wireless device may concatenate multiple medium access control service data units using a common header. In the example of FIG. 4B, the value of the "F" field is 1. That is, the value 1 of the "F" field 460 may indicate there are two (x+y+1 byte) medium access control service data units. In some examples, the wireless device may generate the transport block including a logical channel identifier indicating a length of a medium access control protocol data unit including one or more medium access control service data units, or one or more medium access control layer control elements, or a combination thereof. As depicted in the example of FIGS. 4A and 4B, the "LCID" field 415 and the "LCID" field 465 may be configured to indicate a fixed length of a medium access control protocol data unit. In some cases, the "LCID" field 415 and the "LCID" field 465 may be included in one or more fixed length medium access control service data units and one or more medium access control layer control elements.

Figure 5A:
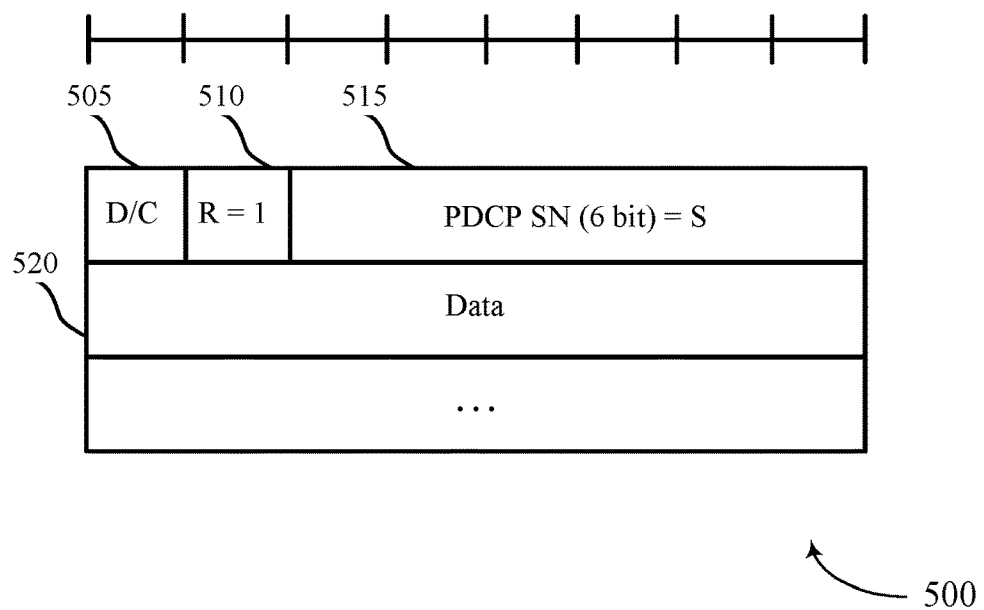
FIGS. 5A and 5B illustrate examples of protocol data units that support protocol overhead reduction in accordance with aspects of the present disclosure.
Figure 5B:
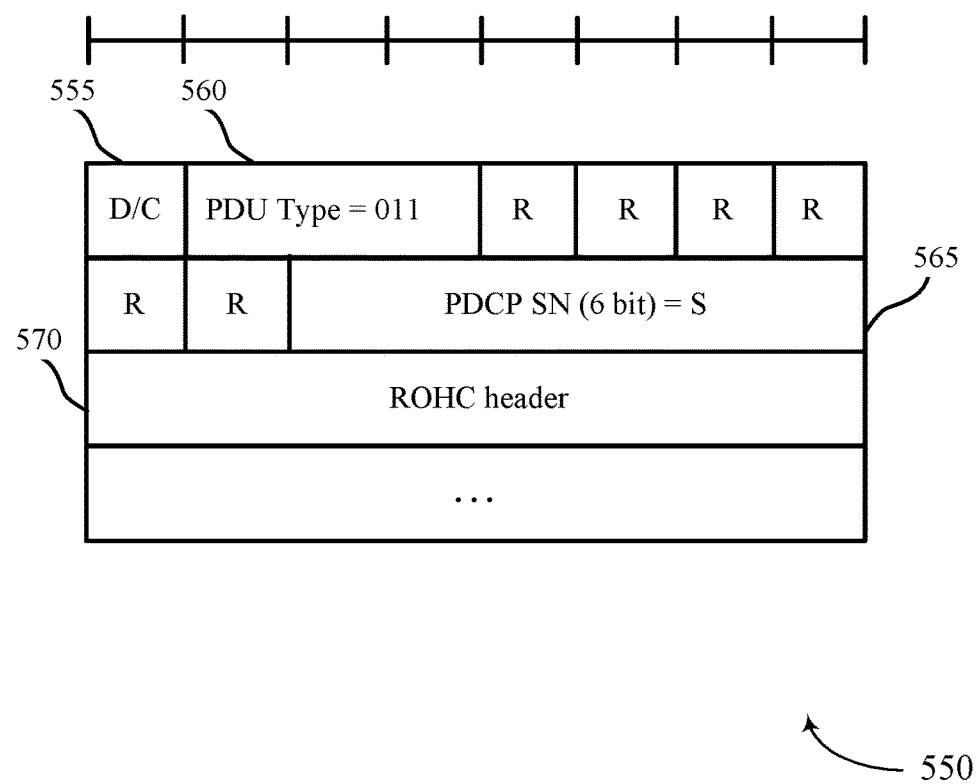

FIG. 5A illustrates an example of a protocol data unit 500 that supports protocol overhead reduction in accordance with aspects of the present disclosure. FIG. 5B illustrates an example of a protocol data unit 550 that supports protocol overhead reduction in accordance with aspects of the present disclosure. In some examples, the protocol data unit 500 and the protocol data unit 550 may implement aspects of the wireless communications system 100 and the wireless communications system 200 as depicted with reference to FIG. 1 and FIG. 2. For example, UEs 115 and/or base stations 105, which may be examples of the corresponding devices as described with reference to FIGS. 1 and 2, may generate a transport block including the protocol data unit 500 or the protocol data unit 550 or both according to techniques discussed herein.

The protocol data unit 500 includes a header including a "D/C" field 505, an "R" field 510, and a "PDCP SN" field 515 for a packet data convergence protocol (PDCP) sequence number (SN). The "D/C" field 505 indicates whether the protocol data unit 500 includes data or control. The "R" field 510 includes a bit (R=1) and the "PDCP SN" field 515 includes six bits. The data field 520 includes the payload for the protocol data unit 500. As depicted herein, a wireless device (e.g., a communication device such as a UE or a base station) may support a data radio bearer associated with voice traffic. The wireless device may generate a transport block including the voice traffic based on one or more parameters associated with the voice traffic. The generated transport block may include the protocol data unit 500 or the protocol data unit 550 or both.

According to one or more aspects, a size of a robust header compression header may be variable depending on a state of the robust header compression header. A variable robust header compression header may lead to uncertainty in the size of a radio link control protocol data unit to fully utilize a fixed size of a transport block size configured grant. If the robust header compression header leads to a larger protocol data unit (e.g., protocol data unit 500) of a packet data convergence protocol than a configured grant transport block size, then the robust header compression header and the payload may be split and sent as separate packets in the additional shared channel resource. In such a case, the receiver may wait until it receives a full robust header compression header for a given packet data convergence protocol sequence number.

In order to split the robust header compression header and the payload, the wireless device may generate a transport block including a first field, a second field and a third field in a packet data convergence protocol header of a protocol data unit. The first field may correspond to the "D/C" field 505 and may indicate whether the protocol data unit 500 includes data or control information. The second field may correspond to the R" field 510 and may indicate whether a robust header compression header is included in a packet data convergence protocol control packet. Additionally, or alternatively, a wait indication can be added in packet data convergence protocol header using a reserved "R" bit in the R" field 510. The third field may correspond to the "PDCP SN" field 515 and may include a packet data convergence protocol sequence number.

As depicted in the example of FIGS. 5A and 5B, the wireless device transmits the robust header compression header as a new packet data convergence protocol control packet (e.g., a packet data convergence protocol control packet included in protocol data unit 550). As depicted in the example of FIG. 5B, the protocol data unit 550 includes a header including a "D/C" field 555, a "PDU type" field 560 (e.g., a field associated with a protocol data unit (PDU), and a "PDCP SN" field 565. The "D/C" field 555 indicates whether the protocol data unit 550 includes data or control. The protocol data unit 550 further includes the robust header compression header in the field 570. In some examples, the wireless device may generate the transport block including a packet data convergence protocol control protocol data unit including the robust header compression header and the packet data convergence protocol sequence number. As shown in the example of FIG. 5B, the "PDU type" field 560 includes a reserved code or a bit sequence (011) to indicate that the protocol data unit 550 includes a robust header compression header. A wireless device may use a mapping (as shown in Table 2) to determine whether a value of the "PDU type" field 560 indicates that the protocol data unit 550 includes a robust header compression header. Upon receiving the robust header compression header for a given packet data convergence protocol sequence number, the wireless device may process the packet data. In some examples, robust header compression (ROHC) may be an example of techniques used to compress a header (or combination of headers and subheaders) of a packet. In some example, ethernet header compression (EHC) may be example of techniques used to compress a header (or combination of headers and subheaders) of a packet.

TABLE 2

| Bit | Description |
| --- | --- |
| 000 | PDCP status report |
| 001 | Interspersed ROHC feedback |
| 010 | EHC feedback |
| 011 | ROHC header |
| 100-111 | Reserved |

Figure 6:
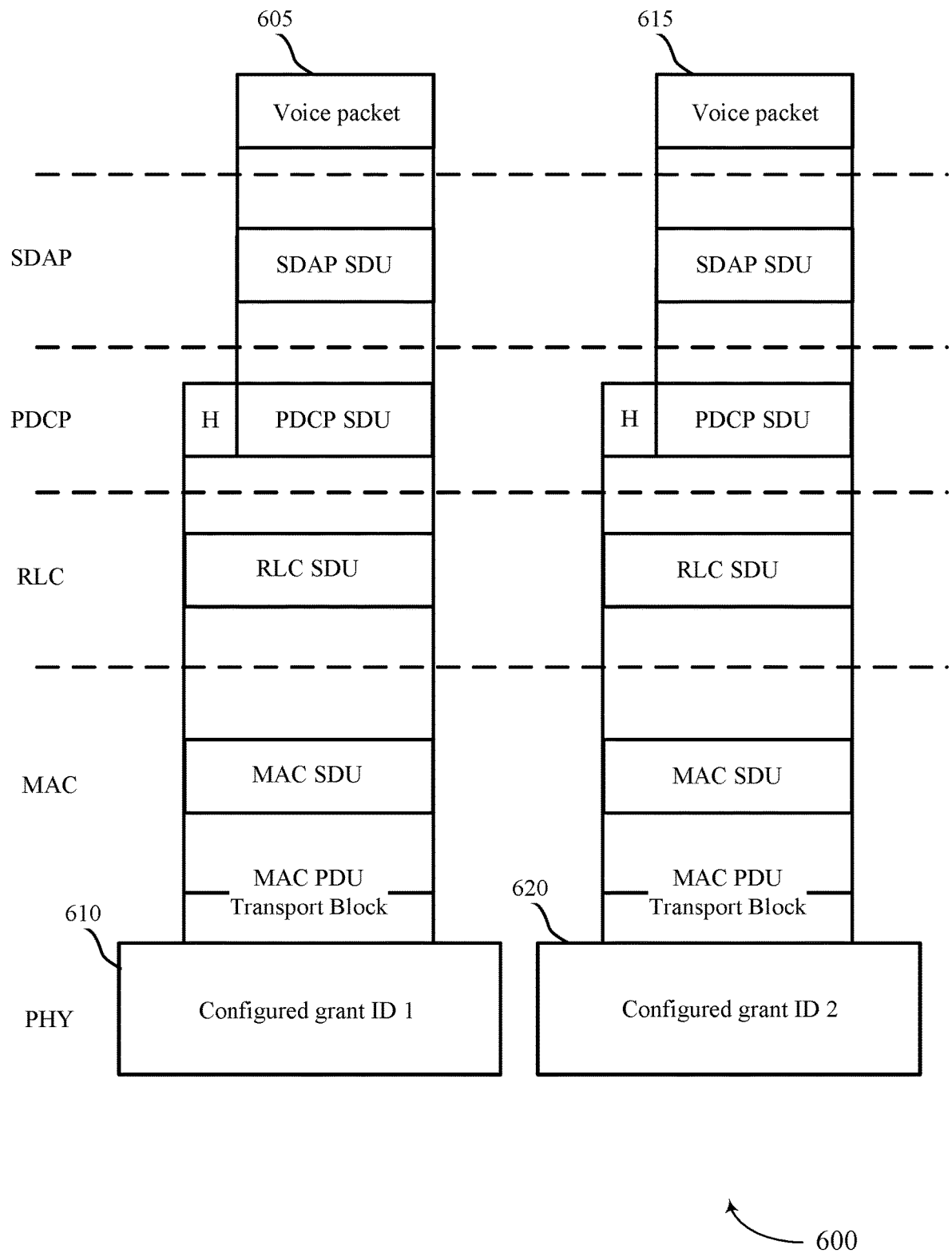
FIG. 6 illustrates an example of a transport block generation process that supports protocol overhead reduction in accordance with aspects of the present disclosure.

FIG. 6 illustrates an example of a transport block generation process 600 that supports protocol overhead reduction in accordance with aspects of the present disclosure. In some examples, the transport block generation process 600 may implement aspects of the wireless communications system 100 and the wireless communications system 200 as depicted with reference to FIG. 1 and FIG. 2. For example, UEs 115 and/or base stations 105, which may be examples of the corresponding devices as described with reference to FIGS. 1 and 2, may generate a transport block according to techniques discussed herein.

According to one or more aspects, a wireless device receives a configuration for a data radio bearer and a configured grant associated with voice traffic. In some examples, the wireless device may receive the configuration from a non-terrestrial network. The wireless device then identifies a mapping between a configured grant identifier and the data radio bearer based on the configuration. Upon identifying the mapping, the wireless device generates a transport block including the voice traffic based on the mapping between the configured grant identifier and the data radio bearer. The wireless device transmits the generated transport block including the voice traffic.

As depicted in the example of FIG. 6, the wireless device may eliminate service data application protocol overhead, may eliminate radio link control overhead or may eliminate medium access control overhead. That is, the wireless device may use a transparent mode at a service data application protocol layer, a transparent mode at a radio link control layer and a transparent mode at a medium access control layer. In some examples, a configuration may indicate whether a transparent mode at a service data application protocol layer is used, a transparent mode at a radio link control layer is used, or a transparent mode at a medium access control layer is used. A dedicated configured grant or semi-persistent scheduling identity may be mapped to an identifier of the data radio bearer associated with voice traffic. As shown in the example of FIG. 6, a first voice packet 605 is mapped to a first configured grant 610 and a second voice packet 615 is mapped to a second configured grant 620. In some examples, all headers except packet data convergence protocol may be removed from the transport block. In such cases, the wireless device may generate the transport block without including a service data adaptation protocol header, a radio link control header and a medium access control header in the transport block, and may then generate a packet data convergence protocol header in the transport block. According to one or more aspects, the wireless device may be configured to use one byte of the packet data convergence protocol header for counting (this can be used for ciphering). The count may be a packet data convergence protocol sequence number length or a new parameter shared by packet data convergence protocol layer and application layer. The new parameter may correspond to a sequence number. For example, the packet data convergence protocol header may include a byte indicating a packet data convergence protocol sequence number length or a sequence number shared by a packet data convergence protocol layer associated with the wireless device and an application layer associated with the wireless device.

One or more than one configured grant identities (multiple configured grants or semi-persistently scheduled grants) 610 and 620 may be mapped to a single voice data radio bearer or can be mapped one to one with multiple voice data radio bearers. In some instances, the wireless device may identify a mapping between a set of configured grant identifiers and the data radio bearer. Additionally, or alternatively, the wireless device may identify a mapping between the configured grant identifier and an identifier associated with the data radio bearer. Based on codec rate and other control frames for the voice traffic, multiple configured grants or semi-persistently scheduled grants and/or multiple voice data radio bearers can be configured. For example, the wireless device may receive a configuration, where the configuration is associated with a codec rate, a control frame associated with the voice traffic, or a combination thereof.

Figure 7:
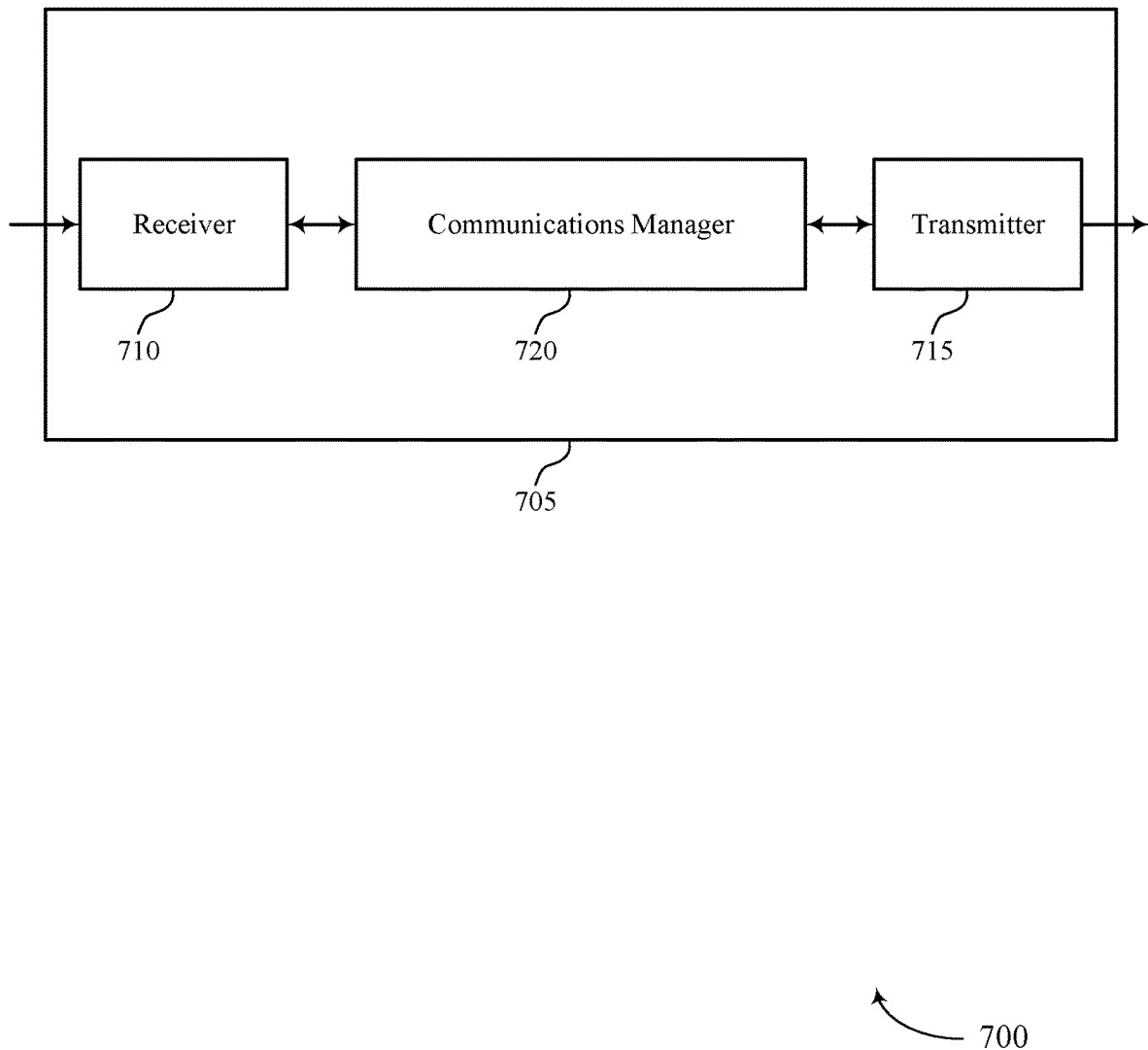
FIGS. 7 and 8 show block diagrams of devices that support protocol overhead reduction in accordance with aspects of the present disclosure.

FIG. 7 shows a block diagram 700 of a device 705 that supports protocol overhead reduction in accordance with aspects of the present disclosure. The device 705 may be an example of aspects of a UE 115 or a base station 105 as described herein. The device 705 includes a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to protocol overhead reduction). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to protocol overhead reduction). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of protocol overhead reduction as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a wireless device in accordance with examples as disclosed herein. For example, the communications manager 720 may be configured as or otherwise support a means for receiving, from a wireless network node, a configuration for a data radio bearer associated with voice traffic in a wireless communications network, the configuration indicating one or more parameters associated with the voice traffic communicated over the wireless communications network. The communications manager 720 may be configured as or otherwise support a means for generating a transport block including the voice traffic based on the one or more parameters associated with the voice traffic. The communications manager 720 may be configured as or otherwise support a means for transmitting, over the wireless communications network, the generated transport block including the voice traffic.

Additionally, or alternatively, the communications manager 720 may support wireless communication at a wireless device in accordance with examples as disclosed herein. For example, the communications manager 720 may be configured as or otherwise support a means for receiving a configuration for a data radio bearer and a configured grant associated with voice traffic. The communications manager 720 may be configured as or otherwise support a means for identifying a mapping between a configured grant identifier and the data radio bearer based on the configuration. The communications manager 720 may be configured as or otherwise support a means for generating a transport block including the voice traffic based on the mapping between the configured grant identifier and the data radio bearer. The communications manager 720 may be configured as or otherwise support a means for transmitting the generated transport block including the voice traffic.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, more efficient utilization of communication resources.

Figure 8:
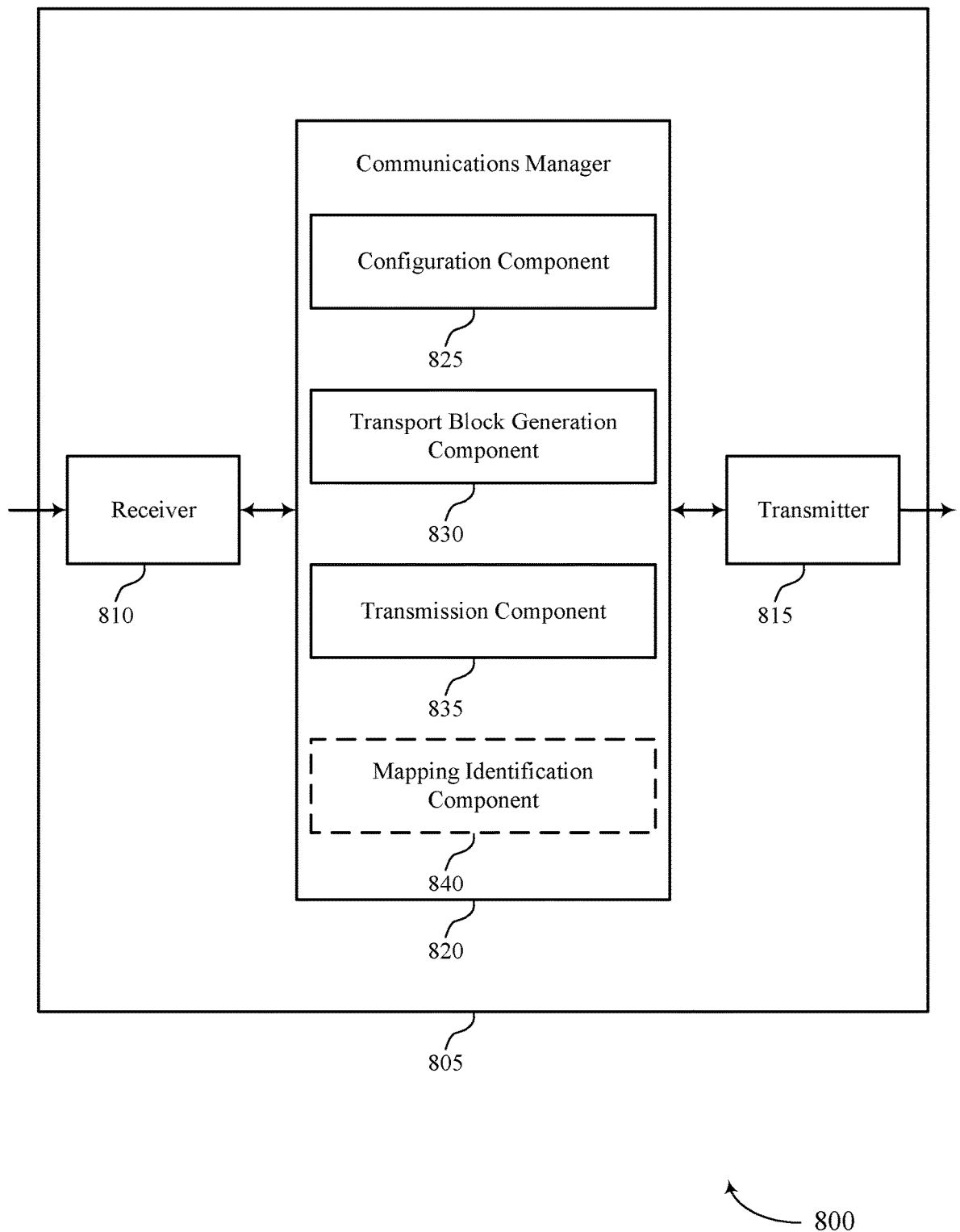

FIG. 8 shows a block diagram 800 of a device 805 that supports protocol overhead reduction in accordance with aspects of the present disclosure. The device 805 may be an example of aspects of a device 705, a UE 115, or a base station 105 as described herein. The device 805 includes a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to protocol overhead reduction). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to protocol overhead reduction). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of protocol overhead reduction as described herein. For example, the communications manager 820 includes a configuration component 825, a transport block generation component 830, a transmission component 835, and an optional mapping identification component 840. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a wireless device in accordance with examples as disclosed herein. The configuration component 825 may be configured as or otherwise support a means for receiving, from a wireless network node, a configuration for a data radio bearer associated with voice traffic in a wireless communications network, the configuration indicating one or more parameters associated with the voice traffic communicated over the wireless communications network. The transport block generation component 830 may be configured as or otherwise support a means for generating a transport block including the voice traffic based on the one or more parameters associated with the voice traffic. The transmission component 835 may be configured as or otherwise support a means for transmitting, over the wireless communications network, the generated transport block including the voice traffic.

Additionally, or alternatively, the communications manager 820 may support wireless communication at a wireless device in accordance with examples as disclosed herein. The configuration component 825 may be configured as or otherwise support a means for receiving a configuration for a data radio bearer and a configured grant associated with voice traffic. The mapping identification component 840 may be configured as or otherwise support a means for identifying a mapping between a configured grant identifier and the data radio bearer based on the configuration. The transport block generation component 830 may be configured as or otherwise support a means for generating a transport block including the voice traffic based on the mapping between the configured grant identifier and the data radio bearer. The transmission component 835 may be configured as or otherwise support a means for transmitting the generated transport block including the voice traffic.

Figure 9:
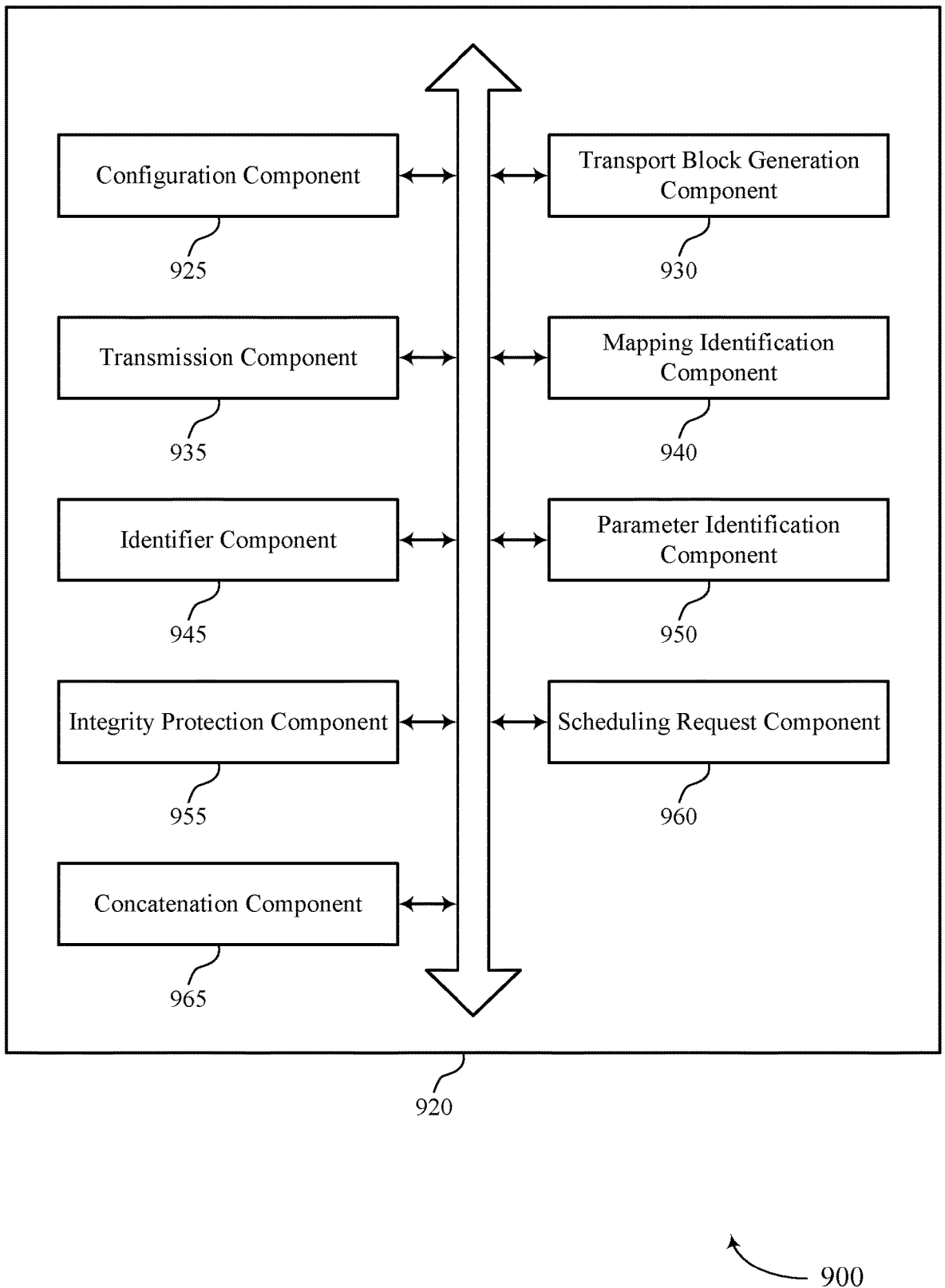
FIG. 9 shows a block diagram of a communications manager that supports protocol overhead reduction in accordance with aspects of the present disclosure.

FIG. 9 shows a block diagram 900 of a communications manager 920 that supports protocol overhead reduction in accordance with aspects of the present disclosure. The communications manager 920 may be an example of aspects of a communications manager 720, a communications manager 820, or both, as described herein. The communications manager 920, or various components thereof, may be an example of means for performing various aspects of protocol overhead reduction as described herein. For example, the communications manager 920 includes a configuration component 925, a transport block generation component 930, a transmission component 935, a mapping identification component 940, an identifier component 945, a parameter identification component 950, an integrity protection component 955, a scheduling request component 960, and a concatenation component 965. Each of these components may communicate, directly or indirectly, with one another (e.g., via one or more buses).

The communications manager 920 may support wireless communication at a wireless device in accordance with examples as disclosed herein. The configuration component 925 may be configured as or otherwise support a means for receiving, from a wireless network node, a configuration for a data radio bearer associated with voice traffic in a wireless communications network, the configuration indicating one or more parameters associated with the voice traffic communicated over the wireless communications network. The transport block generation component 930 may be configured as or otherwise support a means for generating a transport block including the voice traffic based on the one or more parameters associated with the voice traffic. The transmission component 935 may be configured as or otherwise support a means for transmitting, over the wireless communications network, the generated transport block including the voice traffic.

In some examples, the identifier component 945 may be configured as or otherwise support a means for receiving an identifier associated with the data radio bearer. In some examples, the transport block generation component 930 may be configured as or otherwise support a means for determining that the data radio bearer is associated with the voice traffic based on the identifier associated with the data radio bearer, where the generation of the transport block is based on determining that the data radio bearer is associated with the voice traffic.

In some examples, the parameter identification component 950 may be configured as or otherwise support a means for identifying the one or more parameters associated with the voice traffic based on receiving the configuration. In some examples, the transport block generation component 930 may be configured as or otherwise support a means for determining that the data radio bearer is associated with the voice traffic based on the one or more parameters, where the generation of the transport block is based on determining that the data radio bearer is associated with the voice traffic.

In some examples, to support generating the transport block, the transport block generation component 930 may be configured as or otherwise support a means for including a quality of service flow identifier without including a service data adaptation protocol header in the transport block based on the data radio bearer being associated with the voice traffic in the wireless communications network, where the generation of the transport block is based on a quality of service profile that is associated with the data radio bearer.

In some examples, to support generating the transport block, the transport block generation component 930 may be configured as or otherwise support a means for generating the transport block including a packet data convergence protocol sequence number of a first length that is less than a second length of the packet data convergence protocol sequence number associated with other data radio bearers associated with other types of traffic.

In some examples, to support generating the transport block, the integrity protection component 955 may be configured as or otherwise support a means for generating the transport block without including a message authentication code for integrity. In some examples, to support generating the transport block, the transport block generation component 930 may be configured as or otherwise support a means for generating the transport block including a voice packet without segmentation, the transport block including a radio link control layer protocol data unit.

In some examples, to support generating the transport block, the transport block generation component 930 may be configured as or otherwise support a means for generating the transport block including two or fewer radio link control segmentations. In some examples, to support generating the transport block, the transport block generation component 930 may be configured as or otherwise support a means for generating the transport block including a radio link control layer protocol data unit without including a radio link control header in the transport block.

In some examples, to support generating the transport block, the transport block generation component 930 may be configured as or otherwise support a means for generating the transport block using a transparent mode at a radio link control layer.

In some examples, to support generating the transport block, the transport block generation component 930 may be configured as or otherwise support a means for generating the transport block including a medium access control header in the transport block.

In some examples, to support generating the transport block, the transport block generation component 930 may be configured as or otherwise support a means for generating the transport block including a medium access control protocol data unit including a logical channel identifier associated with bearer for the voice traffic, the logical channel identifier including a reserved codepoint or a re-purposed codepoint.

In some examples, the mapping identification component 940 may be configured as or otherwise support a means for identifying a codepoint reserved for a voice data radio bearer from a mapping between a set of multiple codepoints and a set of multiple logical channel identifiers, where the generating of the transport block includes generating the transport block including a logical channel identifier corresponding to the identified codepoint.

In some examples, the mapping identification component 940 may be configured as or otherwise support a means for identifying a mapping between a set of multiple codepoints and a set of multiple logical channel identifiers, the mapping being associated with a non-terrestrial network, where the generating of the transport block includes generating the transport block including a logical channel identifier corresponding to at least one codepoint of the set of multiple codepoints.

In some examples, to support generating the transport block, the transport block generation component 930 may be configured as or otherwise support a means for generating the transport block including a medium access control protocol data unit with a logical channel identifier indicating a length of a medium access control service data unit. In some examples, the length of the medium access control service data unit is configured via a radio resource control signal or a broadcast signal.

In some examples, to support generating the transport block, the transport block generation component 930 may be configured as or otherwise support a means for generating the transport block including a medium access control protocol data unit with a field in a header, the field including a bit, where a value of the bit indicates a number of medium access control service data units concatenated in the transport block.

In some examples, to support generating the transport block, the transport block generation component 930 may be configured as or otherwise support a means for generating the transport block including a first field including a first bit and a second field including a second bit, where a combination of the first bit and the second bit indicates a quantity of radio link control service data units concatenated in the transport block.

In some examples, to support generating the transport block, the transport block generation component 930 may be configured as or otherwise support a means for generating the transport block including a logical channel identifier indicating a length of a medium access control protocol data unit including one or more medium access control service data units, or one or more medium access control layer control elements, or a combination thereof.

In some examples, a first configured grant for the data radio bearer associated with the voice traffic is configured with a first periodicity for a transport block size. In some examples, a second configured grant is configured with a second periodicity with a start offset. In some examples, the second configured grant is used to transmit a buffer status report medium access control layer control element, a power headroom report medium access control layer control element, or an interspersed robust header compression feedback, or a combination thereof.

In some examples, the scheduling request component 960 may be configured as or otherwise support a means for communicating a scheduling request indicating a set of time and frequency resources for the data radio bearer associated with the voice traffic, where communication the scheduling request includes transmitting the scheduling request or receiving the scheduling request.

In some examples, to support generating the transport block, the transport block generation component 930 may be configured as or otherwise support a means for generating the transport block including a first field, a second field and a third field in a packet data convergence protocol header of a protocol data unit, where the first field indicates whether the protocol data unit includes data or control information, the second field indicates whether a robust header compression header is included in a packet data convergence protocol control packet, and the third field includes a packet data convergence protocol sequence number.

In some examples, to support generating the transport block, the transport block generation component 930 may be configured as or otherwise support a means for generating the transport block including a packet data convergence protocol control protocol data unit including the robust header compression header and the packet data convergence protocol sequence number.

In some examples, the concatenation component 965 may be configured as or otherwise support a means for generating a concatenated packet including a first packet of voice data and a second packet of voice data concatenated in a protocol data unit, the first packet of voice data including a retransmitting of a prior packet of voice data and the second packet of voice data including an original transmission of a current packet of voice data.

In some examples, the concatenation component 965 may be configured as or otherwise support a means for retransmitting the concatenated packet including the first packet of voice data and the second packet of voice data for a threshold quantity of transmissions.

In some examples, a first configured grant for the data radio bearer associated with the voice traffic is associated with an information packet and a second configured grant for the data radio bearer associated with the voice traffic is associated with a duplicate of the information packet.

In some examples, the second configured grant for the data radio bearer associated with the voice traffic includes a robust header compression feedback packet, a robust header compression header, or the duplicate of the information packet dropped by a medium access control layer control element, or a combination thereof. In some examples, the wireless communications network includes a non-terrestrial network.

Additionally, or alternatively, the communications manager 920 may support wireless communication at a wireless device in accordance with examples as disclosed herein. In some examples, the configuration component 925 may be configured as or otherwise support a means for receiving a configuration for a data radio bearer and a configured grant associated with voice traffic. The mapping identification component 940 may be configured as or otherwise support a means for identifying a mapping between a configured grant identifier and the data radio bearer based on the configuration. In some examples, the transport block generation component 930 may be configured as or otherwise support a means for generating a transport block including the voice traffic based on the mapping between the configured grant identifier and the data radio bearer. In some examples, the transmission component 935 may be configured as or otherwise support a means for transmitting the generated transport block including the voice traffic.

In some examples, to support generating the transport block, the transport block generation component 930 may be configured as or otherwise support a means for generating the transport block without including a service data adaptation protocol header, a radio link control header and a medium access control header in the transport block. In some examples, to support generating the transport block, the transport block generation component 930 may be configured as or otherwise support a means for generating a packet data convergence protocol header in the transport block.

In some examples, the packet data convergence protocol header includes a byte indicating a packet data convergence protocol sequence number length or a sequence number shared by a packet data convergence protocol layer associated with the wireless device and an application layer associated with the wireless device. In some examples, to support identifying the mapping, the mapping identification component 940 may be configured as or otherwise support a means for identifying the mapping between a set of multiple configured grant identifiers and the data radio bearer.

In some examples, to support identifying the mapping, the mapping identification component 940 may be configured as or otherwise support a means for identifying the mapping between the configured grant identifier and an identifier associated with the data radio bearer. In some examples, the configuration is associated with a codec rate, a control frame associated with the voice traffic, or a combination thereof.

Figure 10:
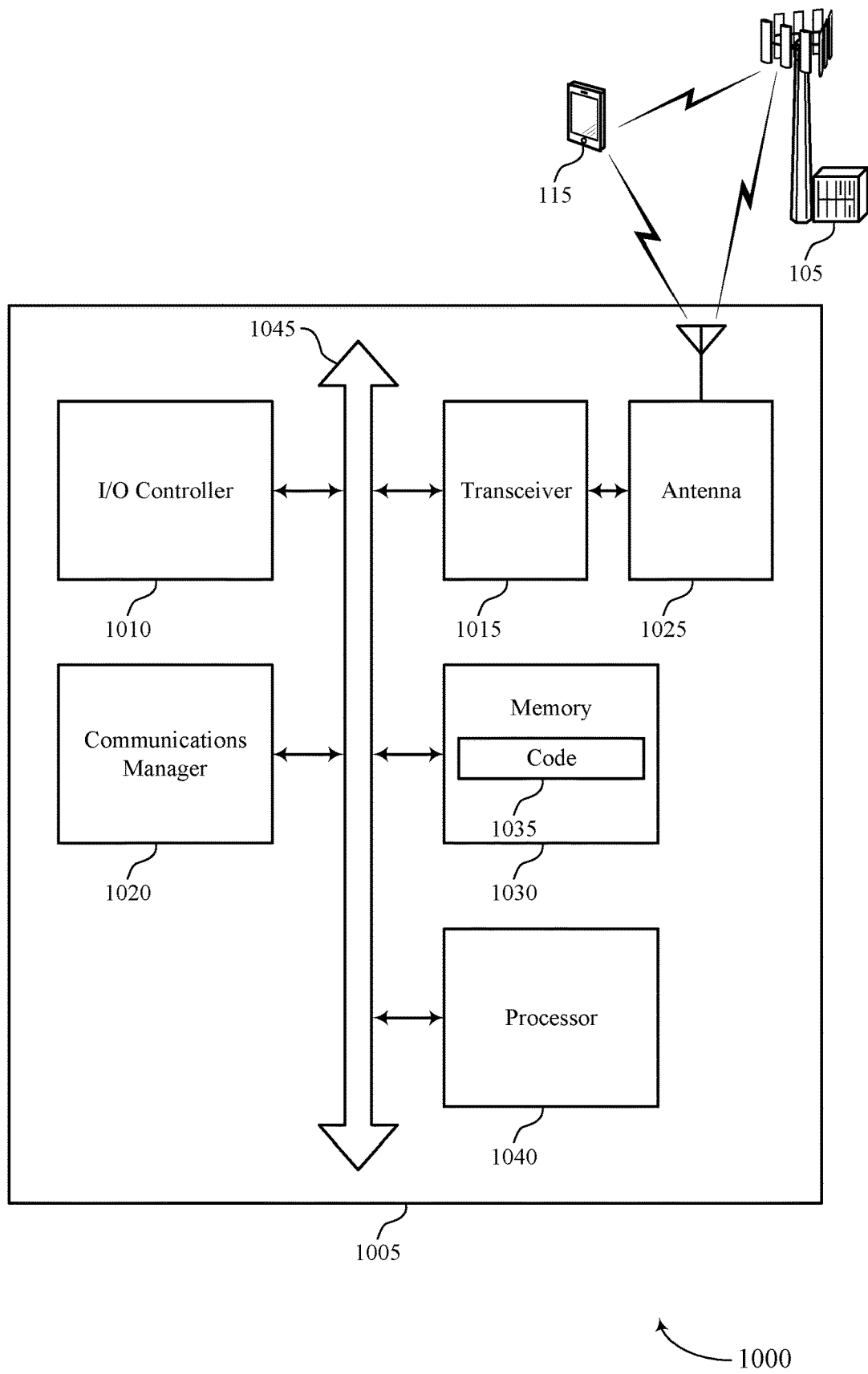
FIG. 10 shows a diagram of a system including a UE that supports protocol overhead reduction in accordance with aspects of the present disclosure.

FIG. 10 shows a diagram of a system 1000 including a device 1005 that supports protocol overhead reduction in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 includes components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In the embodiment shown, the device 1005 includes a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 stores computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting protocol overhead reduction). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a wireless device in accordance with examples as disclosed herein. For example, the communications manager 1020 may be configured as or otherwise support a means for receiving, from a wireless network node, a configuration for a data radio bearer associated with voice traffic in a wireless communications network, the configuration indicating one or more parameters associated with the voice traffic communicated over the wireless communications network. The communications manager 1020 may be configured as or otherwise support a means for generating a transport block including the voice traffic based on the one or more parameters associated with the voice traffic. The communications manager 1020 may be configured as or otherwise support a means for transmitting, over the wireless communications network, the generated transport block including the voice traffic.

Additionally, or alternatively, the communications manager 1020 may support wireless communication at a wireless device in accordance with examples as disclosed herein. For example, the communications manager 1020 may be configured as or otherwise support a means for receiving a configuration for a data radio bearer and a configured grant associated with voice traffic. The communications manager 1020 may be configured as or otherwise support a means for identifying a mapping between a configured grant identifier and the data radio bearer based on the configuration. The communications manager 1020 may be configured as or otherwise support a means for generating a transport block including the voice traffic based on the mapping between the configured grant identifier and the data radio bearer. The communications manager 1020 may be configured as or otherwise support a means for transmitting the generated transport block including the voice traffic.

By including or configuring the communications manager 1020 in accordance with examples as described herein, the device 1005 may support techniques for improved communication reliability, reduced latency, improved user experience related to reduced processing, reduced power consumption, more efficient utilization of communication resources, improved coordination between devices, longer battery life, improved utilization of processing capability.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of protocol overhead reduction as described herein, or the processor 1040 and the memory 1030 may be otherwise configured to perform or support such operations.

Figure 11:
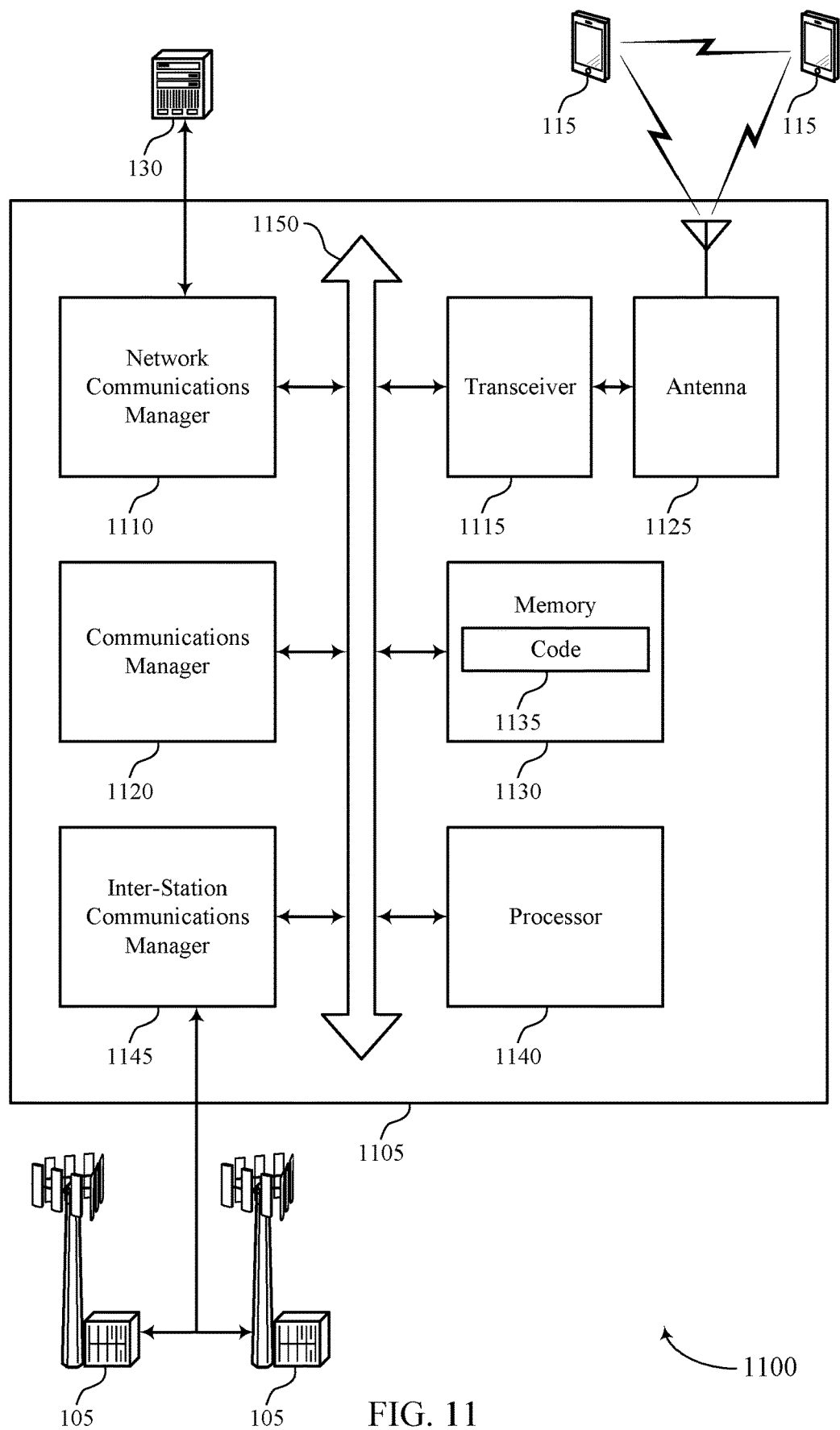
FIG. 11 shows a diagram of a system including a base station that supports protocol overhead reduction in accordance with aspects of the present disclosure.

FIG. 11 shows a diagram of a system 1100 including a device 1105 that supports protocol overhead reduction in accordance with aspects of the present disclosure. The device 1105 may be an example of or include the components of a device 705, a device 805, or a base station 105 as described herein. The device 1105 may communicate wirelessly with one or more base stations 105, UEs 115, or any combination thereof. The device 1105 includes components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145.

These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In the embodiment shown, the device 1105 includes a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 715, a transmitter 815, a receiver 710, a receiver 810, or any combination thereof or component thereof, as described herein.

The memory 1130 may include RAM and ROM. The memory 1130 stores computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting protocol overhead reduction). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a wireless device in accordance with examples as disclosed herein. For example, the communications manager 1120 may be configured as or otherwise support a means for receiving, from a wireless network node, a configuration for a data radio bearer associated with voice traffic in a wireless communications network, the configuration indicating one or more parameters associated with the voice traffic communicated over the wireless communications network. The communications manager 1120 may be configured as or otherwise support a means for generating a transport block including the voice traffic based on the one or more parameters associated with the voice traffic. The communications manager 1120 may be configured as or otherwise support a means for transmitting, over the wireless communications network, the generated transport block including the voice traffic.

Additionally, or alternatively, the communications manager 1120 may support wireless communication at a wireless device in accordance with examples as disclosed herein. For example, the communications manager 1120 may be configured as or otherwise support a means for receiving a configuration for a data radio bearer and a configured grant associated with voice traffic. The communications manager 1120 may be configured as or otherwise support a means for identifying a mapping between a configured grant identifier and the data radio bearer based on the configuration. The communications manager 1120 may be configured as or otherwise support a means for generating a transport block including the voice traffic based on the mapping between the configured grant identifier and the data radio bearer. The communications manager 1120 may be configured as or otherwise support a means for transmitting the generated transport block including the voice traffic.

By including or configuring the communications manager 1120 in accordance with examples as described herein, the device 1105 may support techniques for improved communication reliability, reduced latency, improved user experience related to reduced processing.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of protocol overhead reduction as described herein, or the processor 1140 and the memory 1130 may be otherwise configured to perform or support such operations.

Figure 12:
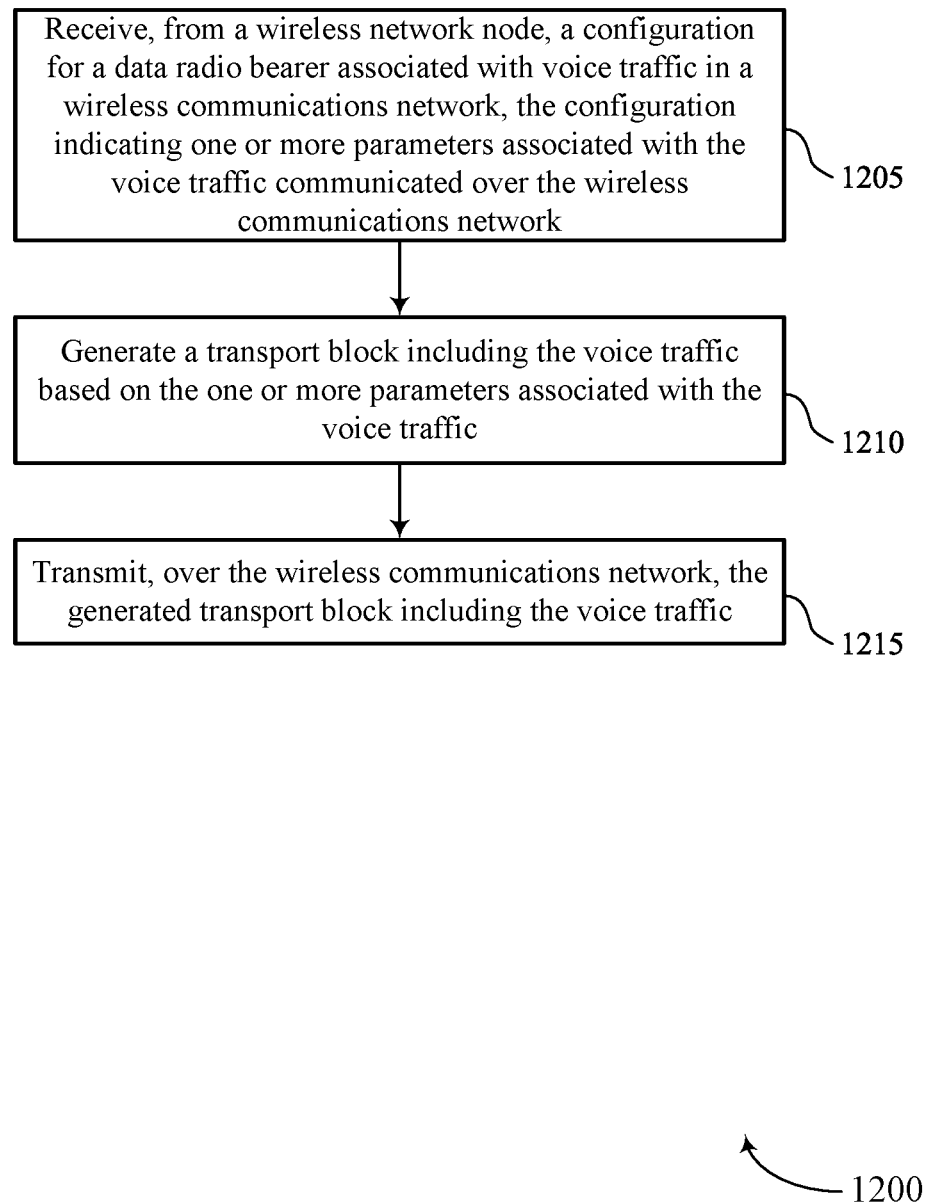
FIGS. 12 through 15 show flowcharts illustrating methods that support protocol overhead reduction in accordance with aspects of the present disclosure.

FIG. 12 shows a flowchart illustrating a method 1200 that supports protocol overhead reduction in accordance with aspects of the present disclosure. The operations of the method 1200 may be implemented by a UE or a base station or its components as described herein. For example, the operations of the method 1200 may be performed by a UE 115 or a base station 105 as described with reference to FIGS. 1 through 11. In some examples, a UE or a base station may execute a set of instructions to control the functional elements of the UE or the base station to perform the described functions. Additionally, or alternatively, the UE or the base station may perform aspects of the described functions using special-purpose hardware.

At 1205, the method includes receiving, from a wireless network node, a configuration for a data radio bearer associated with voice traffic in a wireless communications network, the configuration indicating one or more parameters associated with the voice traffic communicated over the wireless communications network. The operations of 1205 may be performed in accordance with examples as disclosed herein. In some examples, aspects of the operations of 1205 may be performed by a configuration component 925 as described with reference to FIG. 9.

At 1210, the method includes generating a transport block including the voice traffic based on the one or more parameters associated with the voice traffic. The operations of 1210 may be performed in accordance with examples as disclosed herein. In some examples, aspects of the operations of 1210 may be performed by a transport block generation component 930 as described with reference to FIG. 9.

At 1215, the method includes transmitting, over the wireless communications network, the generated transport block including the voice traffic. The operations of 1215 may be performed in accordance with examples as disclosed herein. In some examples, aspects of the operations of 1215 may be performed by a transmission component 935 as described with reference to FIG. 9.

Figure 13:
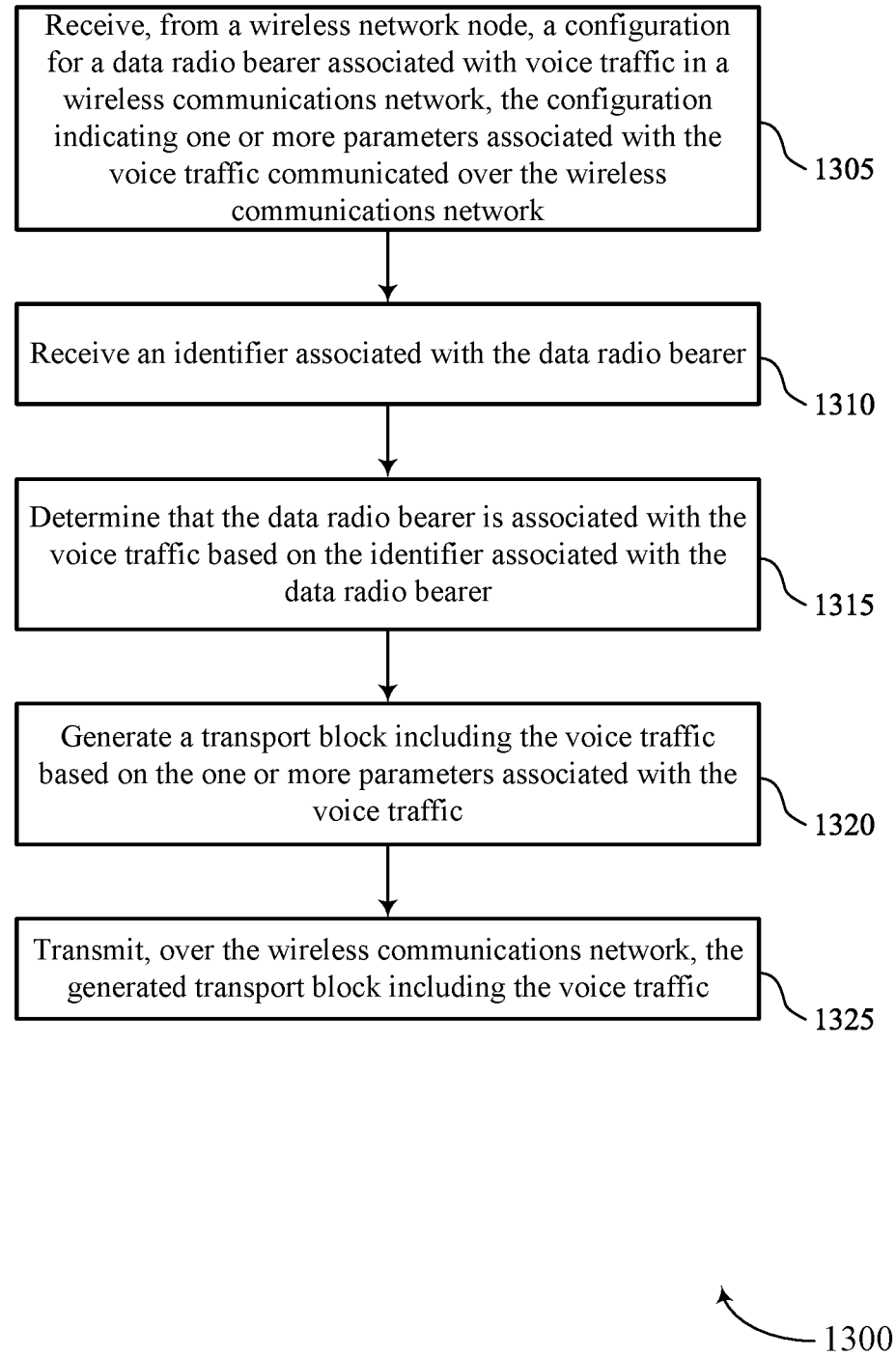

FIG. 13 shows a flowchart illustrating a method 1300 that supports protocol overhead reduction in accordance with aspects of the present disclosure. The operations of the method 1300 may be implemented by a UE or a base station or its components as described herein. For example, the operations of the method 1300 may be performed by a UE 115 or a base station 105 as described with reference to FIGS. 1 through 11. In some examples, a UE or a base station may execute a set of instructions to control the functional elements of the UE or the base station to perform the described functions. Additionally, or alternatively, the UE or the base station may perform aspects of the described functions using special-purpose hardware.

At 1305, the method includes receiving, from a wireless network node, a configuration for a data radio bearer associated with voice traffic in a wireless communications network, the configuration indicating one or more parameters associated with the voice traffic communicated over the wireless communications network. The operations of 1305 may be performed in accordance with examples as disclosed herein. In some examples, aspects of the operations of 1305 may be performed by a configuration component 925 as described with reference to FIG. 9.

At 1310, the method includes receiving an identifier associated with the data radio bearer. The operations of 1310 may be performed in accordance with examples as disclosed herein. In some examples, aspects of the operations of 1310 may be performed by an identifier component 945 as described with reference to FIG. 9.

At 1315, the method includes determining that the data radio bearer is associated with the voice traffic based on the identifier associated with the data radio bearer. The operations of 1315 may be performed in accordance with examples as disclosed herein. In some examples, aspects of the operations of 1315 may be performed by a transport block generation component 930 as described with reference to FIG. 9.

At 1320, the method includes generating a transport block including the voice traffic based on the one or more parameters associated with the voice traffic. In some example, the generation of the transport block may be based on determining that the data radio bearer is associated with the voice traffic. The operations of 1320 may be performed in accordance with examples as disclosed herein. In some examples, aspects of the operations of 1320 may be performed by a transport block generation component 930 as described with reference to FIG. 9.

At 1325, the method includes transmitting, over the wireless communications network, the generated transport block including the voice traffic. The operations of 1325 may be performed in accordance with examples as disclosed herein. In some examples, aspects of the operations of 1325 may be performed by a transmission component 935 as described with reference to FIG. 9.

Figure 14:
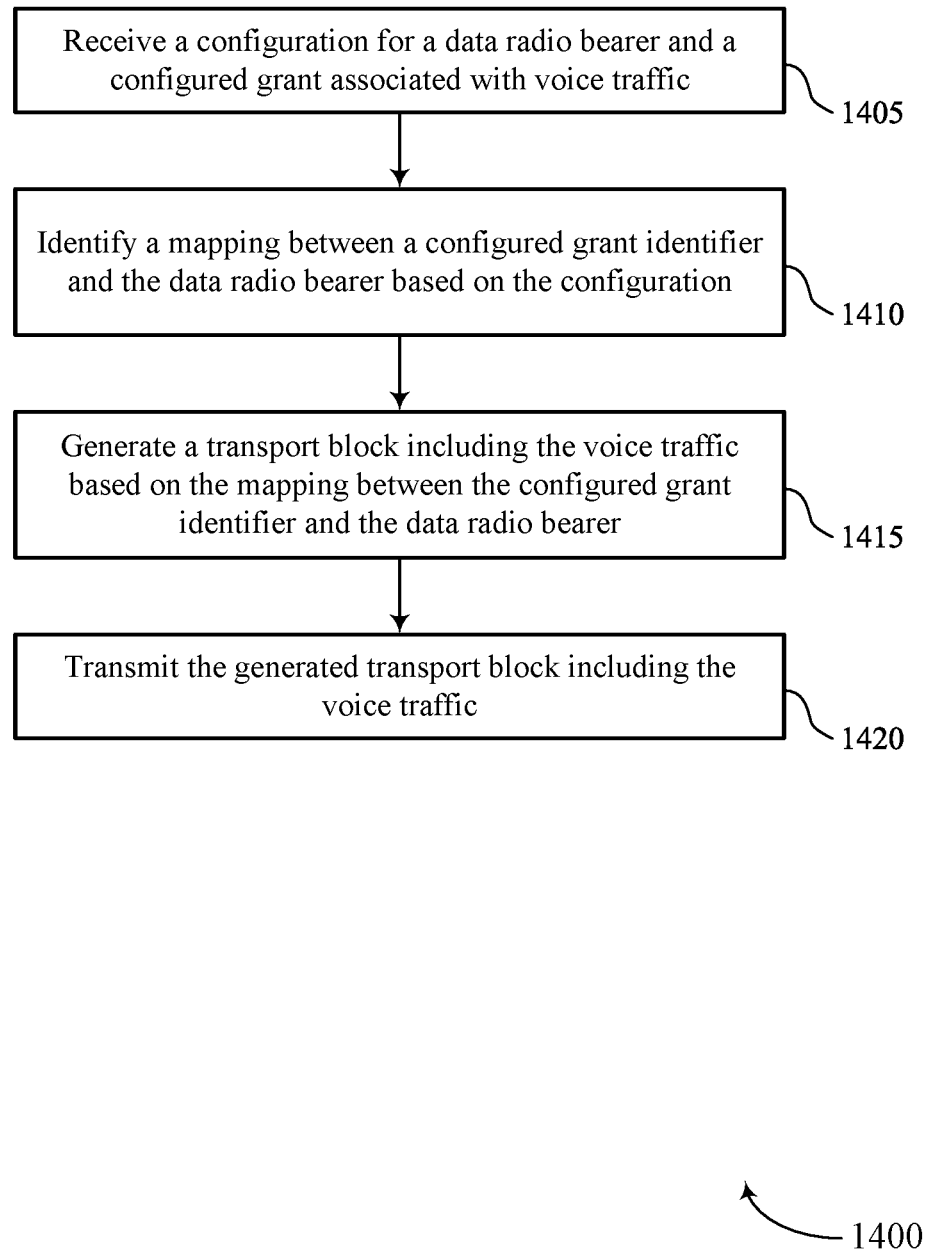

FIG. 14 shows a flowchart illustrating a method 1400 that supports protocol overhead reduction in accordance with aspects of the present disclosure. The operations of the method 1400 may be implemented by a UE or a base station or its components as described herein. For example, the operations of the method 1400 may be performed by a UE 115 or a base station 105 as described with reference to FIGS. 1 through 11. In some examples, a UE or a base station may execute a set of instructions to control the functional elements of the UE or the base station to perform the described functions. Additionally, or alternatively, the UE or the base station may perform aspects of the described functions using special-purpose hardware.

At 1405, the method includes receiving a configuration for a data radio bearer and a configured grant associated with voice traffic. The operations of 1405 may be performed in accordance with examples as disclosed herein. In some examples, aspects of the operations of 1405 may be performed by a configuration component 925 as described with reference to FIG. 9.

At 1410, the method includes identifying a mapping between a configured grant identifier and the data radio bearer based on the configuration. The operations of 1410 may be performed in accordance with examples as disclosed herein. In some examples, aspects of the operations of 1410 may be performed by a mapping identification component 940 as described with reference to FIG. 9.

At 1415, the method includes generating a transport block including the voice traffic based on the mapping between the configured grant identifier and the data radio bearer. The operations of 1415 may be performed in accordance with examples as disclosed herein. In some examples, aspects of the operations of 1415 may be performed by a transport block generation component 930 as described with reference to FIG. 9.

At 1420, the method includes transmitting the generated transport block including the voice traffic. The operations of 1420 may be performed in accordance with examples as disclosed herein. In some examples, aspects of the operations of 1420 may be performed by a transmission component 935 as described with reference to FIG. 9.

Figure 15:
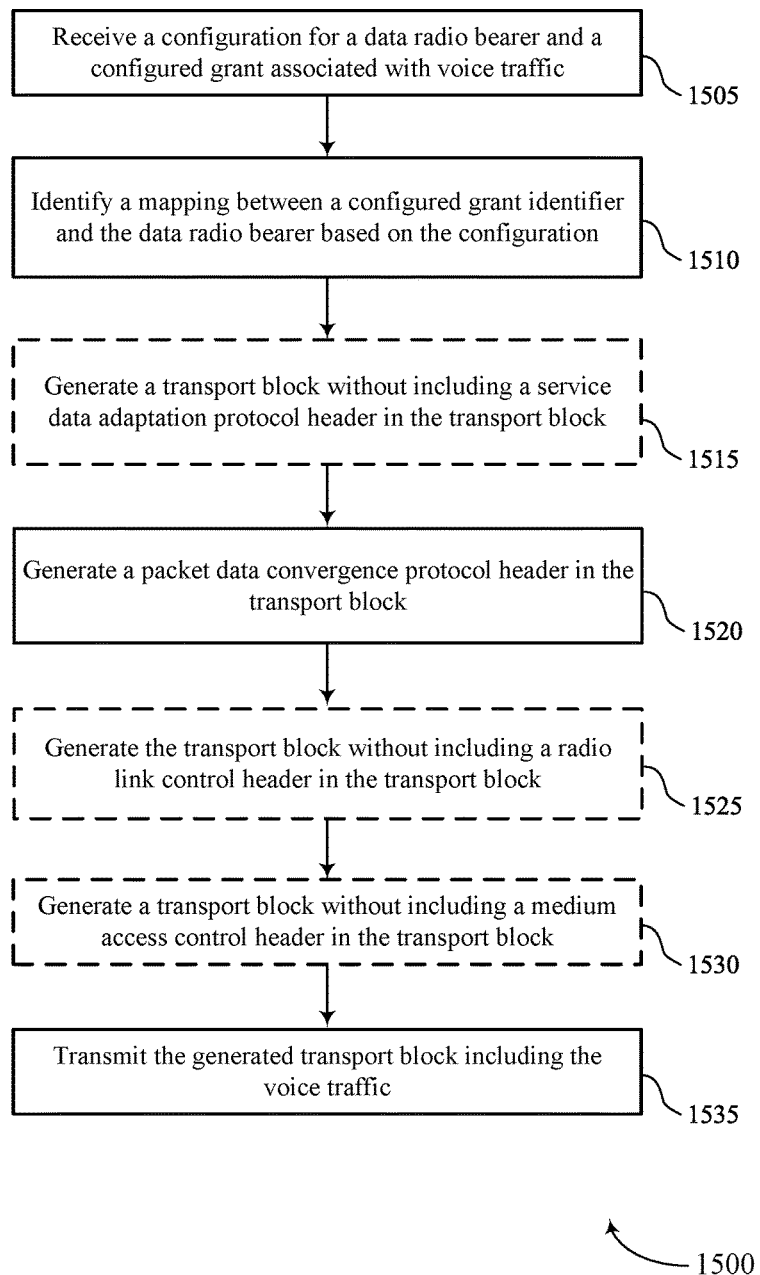

FIG. 15 shows a flowchart illustrating a method 1500 that supports protocol overhead reduction in accordance with aspects of the present disclosure. The operations of the method 1500 may be implemented by a UE or a base station or its components as described herein. For example, the operations of the method 1500 may be performed by a UE 115 or a base station 105 as described with reference to FIGS. 1 through 11. In some examples, a UE or a base station may execute a set of instructions to control the functional elements of the UE or the base station to perform the described functions. Additionally, or alternatively, the UE or the base station may perform aspects of the described functions using special-purpose hardware.

At 1505, the method includes receiving a configuration for a data radio bearer and a configured grant associated with voice traffic. The operations of 1505 may be performed in accordance with examples as disclosed herein. In some examples, aspects of the operations of 1505 may be performed by a configuration component 925 as described with reference to FIG. 9.

At 1510, the method includes identifying a mapping between a configured grant identifier and the data radio bearer based on the configuration. The operations of 1510 may be performed in accordance with examples as disclosed herein. In some examples, aspects of the operations of 1510 may be performed by a mapping identification component 940 as described with reference to FIG. 9.

At 1515, the method optionally includes generating a transport block without including a service data adaptation protocol header. The operations of 1515 may be performed in accordance with examples as disclosed herein. In some examples, aspects of the operations of 1515 may be performed by a transport block generation component 930 as described with reference to FIG. 9.

At 1520, the method includes generating a packet data convergence protocol header in the transport block. The operations of 1520 may be performed in accordance with examples as disclosed herein. In some examples, aspects of the operations of 1520 may be performed by a transport block generation component 930 as described with reference to FIG. 9.

At 1525, the method optionally includes generating a transport block without including a radio link control header in the transport block. The operations of 1525 may be performed in accordance with examples as disclosed herein. In some examples, aspects of the operations of 1525 may be performed by a transport block generation component 930 as described with reference to FIG. 9.

At 1530, the method optionally includes generating a transport block without including a medium access control header in the transport block. The operations of 1530 may be performed in accordance with examples as disclosed herein. In some examples, aspects of the operations of 1530 may be performed by a transport block generation component 930 as described with reference to FIG. 9.

At 1535, the method includes transmitting the generated transport block including the voice traffic. The operations of 1535 may be performed in accordance with examples as disclosed herein. In some examples, aspects of the operations of 1535 may be performed by a transmission component 935 as described with reference to FIG. 9.

The following provides an overview of aspects of the present disclosure:

Aspect 1: A method for wireless communication at a wireless device, comprising: receiving, from a wireless network node, a configuration for a data radio bearer associated with voice traffic in a wireless communications network, the configuration indicating one or more parameters associated with the voice traffic communicated over the wireless communications network; generating a transport block comprising the voice traffic based at least in part on the one or more parameters associated with the voice traffic; and transmitting, over the wireless communications network, the generated transport block comprising the voice traffic.

Aspect 2: The method of aspect 1, further comprising: receiving an identifier associated with the data radio bearer; and determining that the data radio bearer is associated with the voice traffic based at least in part on the identifier associated with the data radio bearer, wherein the generation of the transport block is based at least in part on determining that the data radio bearer is associated with the voice traffic.

Aspect 3: The method of any of aspects 1 through 2, further comprising: identifying the one or more parameters associated with the voice traffic based at least in part on receiving the configuration; and determining that the data radio bearer is associated with the voice traffic based at least in part on the one or more parameters, wherein the generation of the transport block is based at least in part on determining that the data radio bearer is associated with the voice traffic.

Aspect 4: The method of any of aspects 1 through 3, wherein generating the transport block further comprises: identifying a quality of service flow identifier without including a service data adaptation protocol header in the transport block based at least in part on the data radio bearer being associated with the voice traffic in the wireless communications network, wherein the generation of the transport block is based at least in part on a quality of service profile that is associated with the data radio bearer.

Aspect 5: The method of any of aspects 1 through 4, wherein generating the transport block further comprises: generating the transport block comprising a packet data convergence protocol sequence number of a first length that is less than a second length of the packet data convergence protocol sequence number associated with other data radio bearers associated with other types of traffic.

Aspect 6: The method of any of aspects 1 through 5, wherein generating the transport block further comprises: generating the transport block without including a message authentication code for integrity.

Aspect 7: The method of any of aspects 1 through 6, wherein generating the transport block further comprises: generating the transport block comprising a voice packet without segmentation, the transport block comprising a radio link control layer protocol data unit.

Aspect 8: The method of any of aspects 1 through 7, wherein generating the transport block further comprises: generating the transport block comprising two or fewer radio link control segmentations.

Aspect 9: The method of any of aspects 1 through 8, wherein generating the transport block further comprises: generating the transport block comprising a radio link control layer protocol data unit without including a radio link control header in the transport block.

Aspect 10: The method of any of aspects 1 through 9, wherein generating the transport block further comprises: generating the transport block using a transparent mode at a radio link control layer.

Aspect 11: The method of any of aspects 1 through 10, wherein generating the transport block further comprises: generating the transport block comprising a medium access control header in the transport block.

Aspect 12: The method of any of aspects 1 through 11, wherein generating the transport block further comprises: generating the transport block comprising a medium access control protocol data unit including a logical channel identifier associated with bearer for the voice traffic, the logical channel identifier comprising a reserved codepoint or a re-purposed codepoint.

Aspect 13: The method of any of aspects 1 through 12, further comprising: identifying a codepoint reserved for a voice data radio bearer from a mapping between a plurality of codepoints and a plurality of logical channel identifiers, wherein the generating of the transport block comprises generating the transport block comprising a logical channel identifier corresponding to the identified codepoint.

Aspect 14: The method of any of aspects 1 through 13, further comprising: identifying a mapping between a plurality of codepoints and a plurality of logical channel identifiers, the mapping being associated with a non-terrestrial network, wherein the generating of the transport block comprises generating the transport block comprising a logical channel identifier corresponding to at least one codepoint of the plurality of codepoints.

Aspect 15: The method of any of aspects 1 through 14, wherein generating the transport block further comprises: generating the transport block comprising a medium access control protocol data unit with a logical channel identifier indicating a length of a medium access control service data unit.

Aspect 16: The method of aspect 15, wherein the length of the medium access control service data unit is configured via a radio resource control signal or a broadcast signal.

Aspect 17: The method of any of aspects 1 through 16, wherein generating the transport block further comprises: generating the transport block comprising a medium access control protocol data unit with a field in a header, the field including a bit, wherein a value of the bit indicates a number of medium access control service data units concatenated in the transport block.

Aspect 18: The method of any of aspects 1 through 17, wherein generating the transport block further comprises: generating the transport block comprising a first field including a first bit and a second field including a second bit, wherein a combination of the first bit and the second bit indicates a quantity of radio link control service data units concatenated in the transport block.

Aspect 19: The method of any of aspects 1 through 18, wherein generating the transport block further comprises: generating the transport block comprising a logical channel identifier indicating a length of a medium access control protocol data unit including one or more medium access control service data units, or one or more medium access control layer control elements, or a combination thereof.

Aspect 20: The method of any of aspects 1 through 19, wherein a first configured grant for the data radio bearer associated with the voice traffic is configured with a first periodicity for a transport block size.

Aspect 21: The method of aspect 20, wherein. a second configured grant is configured with a second periodicity with a start offset, the second configured grant is used to transmit a buffer status report medium access control layer control element, a power headroom report medium access control layer control element, or an interspersed robust header compression feedback, or a combination thereof.

Aspect 22: The method of any of aspects 1 through 21, further comprising: communicating a scheduling request indicating a set of time and frequency resources for the data radio bearer associated with the voice traffic, wherein communication the scheduling request comprises transmitting the scheduling request or receiving the scheduling request.

Aspect 23: The method of any of aspects 1 through 22, wherein generating the transport block further comprises: generating the transport block comprising a first field, a second field and a third field in a packet data convergence protocol header of a protocol data unit, wherein the first field indicates whether the protocol data unit comprises data or control information, the second field indicates whether a robust header compression header is included in a packet data convergence protocol control packet, and the third field comprises a packet data convergence protocol sequence number.

Aspect 24: The method of aspect 23, wherein generating the transport block further comprises: generating the transport block comprising a packet data convergence protocol control protocol data unit including the robust header compression header and the packet data convergence protocol sequence number.

Aspect 25: The method of any of aspects 1 through 24, further comprising: generating a concatenated packet comprising a first packet of voice data and a second packet of voice data concatenated in a protocol data unit, the first packet of voice data comprising a retransmitting of a prior packet of voice data and the second packet of voice data comprising an original transmission of a current packet of voice data.

Aspect 26: The method of aspect 25, further comprising: retransmitting the concatenated packet comprising the first packet of voice data and the second packet of voice data for a threshold quantity of transmissions.

Aspect 27: The method of any of aspects 1 through 26, wherein a first configured grant for the data radio bearer associated with the voice traffic is associated with an information packet and a second configured grant for the data radio bearer associated with the voice traffic is associated with a duplicate of the information packet.

Aspect 28: The method of aspect 27, wherein the second configured grant for the data radio bearer associated with the voice traffic comprises a robust header compression feedback packet, a robust header compression header, or the duplicate of the information packet dropped by a medium access control layer control element, or a combination thereof.

Aspect 29: The method of any of aspects 1 through 28, wherein the wireless communications network comprises a non-terrestrial network.

Aspect 30: A method for wireless communication at a wireless device, comprising: receiving a configuration for a data radio bearer and a configured grant associated with voice traffic; identifying a mapping between a configured grant identifier and the data radio bearer based at least in part on the configuration; generating a transport block comprising the voice traffic based at least in part on the mapping between the configured grant identifier and the data radio bearer; and transmitting the generated transport block comprising the voice traffic.

Aspect 31: The method of aspect 30, wherein generating the transport block further comprises: generating the transport block without including a service data adaptation protocol header, a radio link control header and a medium access control header in the transport block; and generating a packet data convergence protocol header in the transport block.

Aspect 32: The method of aspect 31, wherein the packet data convergence protocol header comprises a byte indicating a packet data convergence protocol sequence number length or a sequence number shared by a packet data convergence protocol layer associated with the wireless device and an application layer associated with the wireless device.

Aspect 33: The method of any of aspects 30 through 32, wherein identifying the mapping further comprises: identifying the mapping between a plurality of configured grant identifiers and the data radio bearer.

Aspect 34: The method of any of aspects 30 through 33, wherein identifying the mapping further comprises: identifying the mapping between the configured grant identifier and an identifier associated with the data radio bearer.

Aspect 35: The method of any of aspects 30 through 34, wherein the configuration is associated with a codec rate, a control frame associated with the voice traffic, or a combination thereof.

Aspect 36: An apparatus for wireless communication at a wireless device, comprising a processor; memory coupled with the processor; and instructions stored in the memory and executable by the processor to cause the apparatus to perform a method of any of aspects 1 through 29.

Aspect 37: An apparatus for wireless communication at a wireless device, comprising at least one means for performing a method of any of aspects 1 through 29.

Aspect 38: A non-transitory computer-readable medium storing code for wireless communication at a wireless device, the code comprising instructions executable by a processor to perform a method of any of aspects 1 through 29.

Aspect 39: An apparatus for wireless communication at a wireless device, comprising a processor; memory coupled with the processor; and instructions stored in the memory and executable by the processor to cause the apparatus to perform a method of any of aspects 30 through 35.

Aspect 40: An apparatus for wireless communication at a wireless device, comprising at least one means for performing a method of any of aspects 30 through 35.

Aspect 41: A non-transitory computer-readable medium storing code for wireless communication at a wireless device, the code comprising instructions executable by a processor to perform a method of any of aspects 30 through 35.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a wireless device, comprising:
    receiving, from a wireless network node, a configuration for a data radio bearer associated with voice traffic in a wireless communications network, the configuration indicating one or more parameters associated with the voice traffic communicated over the wireless communications network;
    generating a transport block comprising the voice traffic based at least in part on the one or more parameters associated with the voice traffic, wherein generating the transport block further comprises generating the transport block comprising a medium access control protocol data unit with a field in a header, the field including a bit, wherein a value of the bit indicates a number of medium access control service data units concatenated in the transport block; and
    transmitting, over the wireless communications network, the generated transport block comprising the voice traffic.

2. The method of claim 1, further comprising:
    receiving an identifier associated with the data radio bearer; and
    determining that the data radio bearer is associated with the voice traffic based at least in part on the identifier associated with the data radio bearer, wherein the generation of the transport block is based at least in part on determining that the data radio bearer is associated with the voice traffic.

3. The method of claim 1, further comprising:
    identifying the one or more parameters associated with the voice traffic based at least in part on receiving the configuration; and
    determining that the data radio bearer is associated with the voice traffic based at least in part on the one or more parameters, wherein the generation of the transport block is based at least in part on determining that the data radio bearer is associated with the voice traffic.

4. The method of claim 1, wherein generating the transport block further comprises:
    identifying a quality of service flow identifier without including a service data adaptation protocol header in the transport block based at least in part on the data radio bearer being associated with the voice traffic in the wireless communications network, wherein the generation of the transport block is based at least in part on a quality of service profile that is associated with the data radio bearer.

5. The method of claim 1, wherein generating the transport block further comprises:
    generating the transport block comprising a packet data convergence protocol sequence number of a first length that is less than a second length of the packet data convergence protocol sequence number associated with other data radio bearers associated with other types of traffic.

6. The method of claim 1, wherein generating the transport block further comprises:
    generating the transport block without including a message authentication code for integrity.

7. The method of claim 1, wherein generating the transport block further comprises:
    generating the transport block comprising a voice packet without segmentation, the transport block comprising a radio link control layer protocol data unit.

8. The method of claim 1, wherein generating the transport block further comprises:
    generating the transport block comprising two or fewer radio link control segmentations.

9. The method of claim 1, wherein generating the transport block further comprises:
    generating the transport block comprising a radio link control layer protocol data unit without including a radio link control header in the transport block.

10. The method of claim 1, wherein generating the transport block further comprises:
    generating the transport block using a transparent mode at a radio link control layer.

11. The method of claim 1, wherein generating the transport block further comprises:
    generating the transport block comprising a medium access control header in the transport block.

12. The method of claim 1, wherein generating the transport block further comprises:
    generating the transport block comprising a medium access control protocol data unit including a logical channel identifier associated with bearer for the voice traffic, the logical channel identifier comprising a reserved codepoint or a re-purposed codepoint.

13. The method of claim 1, further comprising:
    identifying a codepoint reserved for a voice data radio bearer from a mapping between a plurality of codepoints and a plurality of logical channel identifiers, wherein the generating of the transport block comprises generating the transport block comprising a logical channel identifier corresponding to the identified codepoint.

14. The method of claim 1, further comprising:
    identifying a mapping between a plurality of codepoints and a plurality of logical channel identifiers, the mapping being associated with a non-terrestrial network, wherein the generating of the transport block comprises generating the transport block comprising a logical channel identifier corresponding to at least one codepoint of the plurality of codepoints.

15. The method of claim 1, wherein generating the transport block further comprises:
    generating the transport block comprising a medium access control protocol data unit with a logical channel identifier indicating a length of a medium access control service data unit.

16. The method of claim 15, wherein the length of the medium access control service data unit is configured via a radio resource control signal or a broadcast signal.

17. The method of claim 1, wherein generating the transport block further comprises:
    generating the transport block comprising a first field including a first bit and a second field including a second bit, wherein a combination of the first bit and the second bit indicates a quantity of radio link control service data units concatenated in the transport block.

18. The method of claim 1, wherein generating the transport block further comprises:
generating the transport block comprising a logical channel identifier indicating a length of a medium access control protocol data unit including one or more medium access control service data units, or one or more medium access control layer control elements, or a combination thereof.

19. The method of claim 1, wherein a first configured grant for the data radio bearer associated with the voice traffic is configured with a first periodicity for a transport block size.

20. The method of claim 19, wherein:
a second configured grant is configured with a second periodicity with a start offset,
the second configured grant is used to transmit a buffer status report medium access control layer control element, a power headroom report medium access control layer control element, or an interspersed robust header compression feedback, or a combination thereof.

21. The method of claim 1, further comprising:
communicating a scheduling request indicating a set of time and frequency resources for the data radio bearer associated with the voice traffic, wherein communicating the scheduling request comprises transmitting the scheduling request or receiving the scheduling request.

22. The method of claim 1, wherein generating the transport block further comprises:
generating the transport block comprising a first field, a second field and a third field in a packet data convergence protocol header of a protocol data unit, wherein the first field indicates whether the protocol data unit comprises data or control information, the second field indicates whether a robust header compression header is included in a packet data convergence protocol control packet, and the third field comprises a packet data convergence protocol sequence number.

23. The method of claim 22, wherein generating the transport block further comprises:
generating the transport block comprising a packet data convergence protocol control protocol data unit including the robust header compression header and the packet data convergence protocol sequence number.

24. The method of claim 1, further comprising:
generating a concatenated packet comprising a first packet of voice data and a second packet of voice data concatenated in a protocol data unit, the first packet of voice data comprising a retransmitting of a prior packet of voice data and the second packet of voice data comprising an original transmission of a current packet of voice data.

25. The method of claim 24, further comprising:
retransmitting the concatenated packet comprising the first packet of voice data and the second packet of voice data for a threshold quantity of transmissions.

26. The method of claim 1, wherein a first configured grant for the data radio bearer associated with the voice traffic is associated with an information packet and a second configured grant for the data radio bearer associated with the voice traffic is associated with a duplicate of the information packet.

27. The method of claim 26, wherein the second configured grant for the data radio bearer associated with the voice traffic comprises a robust header compression feedback packet, a robust header compression header, or the duplicate of the information packet dropped by a medium access control layer control element, or a combination thereof.

28. The method of claim 1, wherein the wireless communications network comprises a non-terrestrial network.

29. The method of claim 1, further comprising:
identifying a mapping between a configured grant identifier and the data radio bearer based at least in part on the configuration, wherein the generating of the transport block is based at least in part on the mapping.

30. An apparatus for wireless communication at a wireless device, comprising:
a processor;
memory coupled with the processor; and
instructions stored in the memory and executable by the processor to cause the apparatus to:
receive, from a wireless network node, a configuration for a data radio bearer associated with voice traffic in a wireless communications network, the configuration indicating one or more parameters associated with the voice traffic communicated over the wireless communications network;
generate a transport block comprising the voice traffic based at least in part on the one or more parameters associated with the voice traffic, wherein the instructions to generate the transport block are further executable by the processor to cause the apparatus to generate the transport block comprising a medium access control protocol data unit with a field in a header, the field including a bit, wherein a value of the bit indicates a number of medium access control service data units concatenated in the transport block; and
transmit, over the wireless communications network, the generated transport block comprising the voice traffic.

31. The apparatus of claim 30, wherein the instructions are further executable by the processor to cause the apparatus to:
receive an identifier associated with the data radio bearer; and
determine that the data radio bearer is associated with the voice traffic based at least in part on the identifier associated with the data radio bearer, wherein the generation of the transport block is based at least in part on determining that the data radio bearer is associated with the voice traffic.

32. The apparatus of claim 30, wherein the instructions are further executable by the processor to cause the apparatus to:
identify the one or more parameters associated with the voice traffic based at least in part on receiving the configuration; and
determine that the data radio bearer is associated with the voice traffic based at least in part on the one or more parameters, wherein the generation of the transport block is based at least in part on determining that the data radio bearer is associated with the voice traffic.

33. The apparatus of claim 30, wherein the instructions to generate the transport block are further executable by the processor to cause the apparatus to:
include a quality of service flow identifier without including a service data adaptation protocol header in the transport block based at least in part on the data radio bearer being associated with the voice traffic in the wireless communications network, wherein the generation of the transport block is based at least in part on a quality of service profile that is associated with the data radio bearer.

34. The apparatus of claim 30, wherein the instructions to generate the transport block are further executable by the processor to cause the apparatus to:
generate the transport block comprising a packet data convergence protocol sequence number of a first length that is less than a second length of the packet data convergence protocol sequence number associated with other data radio bearers associated with other types of traffic.

35. The apparatus of claim 30, wherein the instructions to generate the transport block are further executable by the processor to cause the apparatus to:
generate the transport block without including a message authentication code for integrity.

36. The apparatus of claim 30, wherein the instructions to generate the transport block are further executable by the processor to cause the apparatus to:
generate the transport block comprising a voice packet without segmentation, the transport block comprising a radio link control layer protocol data unit.

37. The apparatus of claim 30, wherein the instructions to generate the transport block are further executable by the processor to cause the apparatus to:
generate the transport block comprising two or fewer radio link control segmentations.

38. The apparatus of claim 30, wherein the instructions to generate the transport block are further executable by the processor to cause the apparatus to:
generate the transport block comprising a radio link control layer protocol data unit without including a radio link control header in the transport block.

39. The apparatus of claim 30, wherein the instructions to generate the transport block are further executable by the processor to cause the apparatus to:
generate the transport block using a transparent mode at a radio link control layer.

40. The apparatus of claim 30, wherein the instructions to generate the transport block are further executable by the processor to cause the apparatus to:
generate the transport block comprising a medium access control header in the transport block.

41. The apparatus of claim 30, wherein the instructions to generate the transport block are further executable by the processor to cause the apparatus to:
generate the transport block comprising a medium access control protocol data unit including a logical channel identifier associated with bearer for the voice traffic, the logical channel identifier comprising a reserved codepoint or a re-purposed codepoint.

42. The apparatus of claim 30, wherein the instructions are further executable by the processor to cause the apparatus to:
identify a codepoint reserved for a voice data radio bearer from a mapping between a plurality of codepoints and a plurality of logical channel identifiers, wherein the generating of the transport block comprises generating the transport block comprising a logical channel identifier corresponding to the identified codepoint.

43. The apparatus of claim 30, wherein the instructions are further executable by the processor to cause the apparatus to:
identify a mapping between a plurality of codepoints and a plurality of logical channel identifiers, the mapping being associated with a non-terrestrial network, wherein the generating of the transport block comprises generating the transport block comprising a logical channel identifier corresponding to at least one codepoint of the plurality of codepoints.

44. The apparatus of claim 30, wherein the instructions to generate the transport block are further executable by the processor to cause the apparatus to:
generate the transport block comprising a medium access control protocol data unit with a logical channel identifier indicating a length of a medium access control service data unit.

45. The apparatus of claim 44, wherein the length of the medium access control service data unit is configured via a radio resource control signal or a broadcast signal.

46. The apparatus of claim 30, wherein the instructions to generate the transport block are further executable by the processor to cause the apparatus to:
generate the transport block comprising a first field including a first bit and a second field including a second bit, wherein a combination of the first bit and the second bit indicates a quantity of radio link control service data units concatenated in the transport block.

47. The apparatus of claim 30, wherein the instructions to generate the transport block are further executable by the processor to cause the apparatus to:
generate the transport block comprising a logical channel identifier indicating a length of a medium access control protocol data unit including one or more medium access control service data units, or one or more medium access control layer control elements, or a combination thereof.

48. The apparatus of claim 30, wherein a first configured grant for the data radio bearer associated with the voice traffic is configured with a first periodicity for a transport block size.

49. The apparatus of claim 48, wherein:
a second configured grant is configured with a second periodicity with a start offset,
the second configured grant is used to transmit a buffer status report medium access control layer control element, a power headroom report medium access control layer control element, or an interspersed robust header compression feedback, or a combination thereof.

50. The apparatus of claim 30, wherein the instructions are further executable by the processor to cause the apparatus to:
communicate a scheduling request indicating a set of time and frequency resources for the data radio bearer associated with the voice traffic, wherein communication the scheduling request comprises transmitting the scheduling request or receiving the scheduling request.

51. The apparatus of claim 30, wherein the instructions to generate the transport block are further executable by the processor to cause the apparatus to:
generate the transport block comprising a first field, a second field and a third field in a packet data convergence protocol header of a protocol data unit, wherein the first field indicates whether the protocol data unit comprises data or control information, the second field indicates whether a robust header compression header is included in a packet data convergence protocol control packet, and the third field comprises a packet data convergence protocol sequence number.

52. The apparatus of claim 51, wherein the instructions to generate the transport block are further executable by the processor to cause the apparatus to:

generate the transport block comprising a packet data convergence protocol control protocol data unit including the robust header compression header and the packet data convergence protocol sequence number.

53. The apparatus of claim 30, wherein the instructions are further executable by the processor to cause the apparatus to:
   generate a concatenated packet comprising a first packet of voice data and a second packet of voice data concatenated in a protocol data unit, the first packet of voice data comprising a retransmitting of a prior packet of voice data and the second packet of voice data comprising an original transmission of a current packet of voice data.

54. The apparatus of claim 53, wherein the instructions are further executable by the processor to cause the apparatus to:
   retransmit the concatenated packet comprising the first packet of voice data and the second packet of voice data for a threshold quantity of transmissions.

55. The apparatus of claim 30, wherein a first configured grant for the data radio bearer associated with the voice traffic is associated with an information packet and a second configured grant for the data radio bearer associated with the voice traffic is associated with a duplicate of the information packet.

56. The apparatus of claim 55, wherein the second configured grant for the data radio bearer associated with the voice traffic comprises a robust header compression feedback packet, a robust header compression header, or the duplicate of the information packet dropped by a medium access control layer control element, or a combination thereof.

57. The apparatus of claim 30, wherein the wireless communications network comprises a non-terrestrial network.

58. The apparatus of claim 30, wherein the instructions are further executable by the processor to cause the apparatus to:
   identify a mapping between a configured grant identifier and the data radio bearer based at least in part on the configuration, wherein the generating of the transport block is based at least in part on the mapping.

* * * * *